US011516789B2

(12) United States Patent
Han et al.

(10) Patent No.: US 11,516,789 B2
(45) Date of Patent: Nov. 29, 2022

(54) DOWNLINK TRANSMISSION IN TDD SUPPPORTING FENB-IOTS

(71) Applicant: Apple Inc., Cupertino, CA (US)

(72) Inventors: Seunghee Han, San Jose, CA (US); Debdeep Chatterjee, San Jose, CA (US); Qiaoyang Ye, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/638,086

(22) PCT Filed: Aug. 10, 2018

(86) PCT No.: PCT/US2018/046241
§ 371 (c)(1),
(2) Date: Feb. 10, 2020

(87) PCT Pub. No.: WO2019/032978
PCT Pub. Date: Feb. 14, 2019

(65) Prior Publication Data
US 2020/0396722 A1    Dec. 17, 2020

Related U.S. Application Data

(60) Provisional application No. 62/586,727, filed on Nov. 15, 2017, provisional application No. 62/565,793, (Continued)

(51) Int. Cl.
*H04W 72/04*    (2009.01)
*H04L 1/18*    (2006.01)
(Continued)

(52) U.S. Cl.
CPC ............. *H04W 72/042* (2013.01); *H04L 1/18* (2013.01); *H04L 5/0053* (2013.01); *H04L 27/2657* (2013.01); *H04W 72/0446* (2013.01)

(58) Field of Classification Search
CPC ..... H04W 72/0446; H04W 4/80; H04J 11/00; H04J 11/0073; H04J 11/0076
See application file for complete search history.

(56) References Cited

U.S. PATENT DOCUMENTS

2018/0077690 A1\* 3/2018 Park .................... H04W 72/042
2019/0158261 A1\* 5/2019 Hwang ............... H04L 27/2666
(Continued)

FOREIGN PATENT DOCUMENTS

| CN | 104396174 A | 3/2015 |
|---|---|---|
| KR | 20170012150 A | 2/2017 |
| WO | 2017043801 A1 | 3/2017 |

OTHER PUBLICATIONS

U.S. Appl. No. 62/543,381 provisional application (Year: 2017).\*
(Continued)

*Primary Examiner* — Phirin Sam
*Assistant Examiner* — Debebe A Asefa
(74) *Attorney, Agent, or Firm* — Kowert, Hood, Munyon, Rankin & Goetzel, P.C.

(57) ABSTRACT

Embodiments of a User Equipment (UE), generation Node-B (gNB) and methods of communication are generally described herein. The UE may receive, from a gNB, a narrowband physical downlink control channel (NPDCCH) that indicates a number of narrowband internet-of-things (NB-IoT) downlink subframes for a downlink scheduling delay of a narrowband physical downlink shared channel (NPDSCH) in one or more radio frames configured for time-division duplexing (TDD) operation. Subframes of the one or more radio frames may include uplink subframes, NB-IoT downlink subframes for downlink NB-IoT transmissions, and downlink subframes for other downlink transmissions. The UE may determine the downlink scheduling delay based on an earliest subframe for which a count of
(Continued)

NB-IoT downlink subframes is equal to the number of NB-IoT downlink subframes indicated in the NPDCCH.

20 Claims, 18 Drawing Sheets

Related U.S. Application Data filed on Sep. 29, 2017, provisional application No. 62/544,262, filed on Aug. 11, 2017, provisional application No. 62/544,256, filed on Aug. 11, 2017, provisional application No. 62/544,654, filed on Aug. 11, 2017.

(51) Int. Cl.
*H04L 5/00* (2006.01)
*H04L 27/26* (2006.01)

(56) References Cited

U.S. PATENT DOCUMENTS

| | | | |
|---|---|---|---|
| 2019/0239170 A1* | 8/2019 | Thangarasa | H04W 52/365 |
| 2019/0372696 A1* | 12/2019 | Park | H04J 11/005 |
| 2020/0107247 A1* | 4/2020 | Ioffe | H04W 76/10 |

OTHER PUBLICATIONS

U.S. Appl. No. 62/460,103 provisional application (Year: 2017).*
U.S. Appl. No. 62/454,671 provisional application (Year: 2017).*

Zte, 'Remaining issues on NB-PDCCH design of NB-IoT', RI-161859, 3GPP TSG RAN WGI NB-IoT Ad-Hoc Meeting, Sophia Antipolis, France, Mar. 16, 2016, See pp. 1-5.
WI Rapporteur (Ericsson), 'RAN1 agreements for Rel-13 NB-IoT', RI-161548, 3GPP TSG RAN WGI Meeting #84, St. Julian's, Malta, Mar. 2, 2016, See pp. 2-7.
Qualcomm Incorporated, 'NB-PDCCH design', RI-161933, 3GPP TSG RAN WGI NB-IoT Ad-Hoc Meeting, Sophia Antipolis, France, Mar. 16, 2016, See pp. 1-3.
Intel Corporation, 'Support of discontinuous resource mapping for NB-IoT DL', RI-161949, 3GPP TSG RAN WG NB-IoT Ad-Hoc Meeting, Sophia Antipolis, France, Mar. 16, 2016, See pp. 1-5.
International Search Report and Written Opinion for International Application No. PCT/US2018/046241 dated Dec. 3, 2018.
"16 UE Procedures related to narrowband IoT" Release 14; 3GPP TS 36.213 V14.1.0; Mobile Competence Centre; 650, Route Des Lucioles; F-06921 Sophia-Antipolis Cedex, France; XP051232472, Mar. 5, 2017; 21 Pages.
Wi Rapporteur (Ericsson); "RAN1 agreements for Rel-13 NB-IoT"; 3GPP TSG-RAN WG1 Meeting #85 Ra-165977; Nanjing, China; May 22, 2016; 33 Pages.
Huawei, Hisilicon; "Discussion on hte OCNG definition for NB-IoT"; 3GPP TSG-RAN WG4 Meeting #80 R4-165349; Gothenburg, Sweden: Aug. 22, 2016: 2 Pages.
NTT Docomo; "Views on remaining issues of NB-PDSCH" 3GPP TSG RAN WG1 Meeting #84bis R1-163168; Busan, Korea; Apr. 11, 2016; 4 Pages.
Extended European Search Report for Patent Application No. EP18844017; dated Oct. 21, 2020; 9 Pages.
Chinese Office Action; Application No. 201880065701.X; dated Mar. 23, 2022; 18 pgs.

* cited by examiner

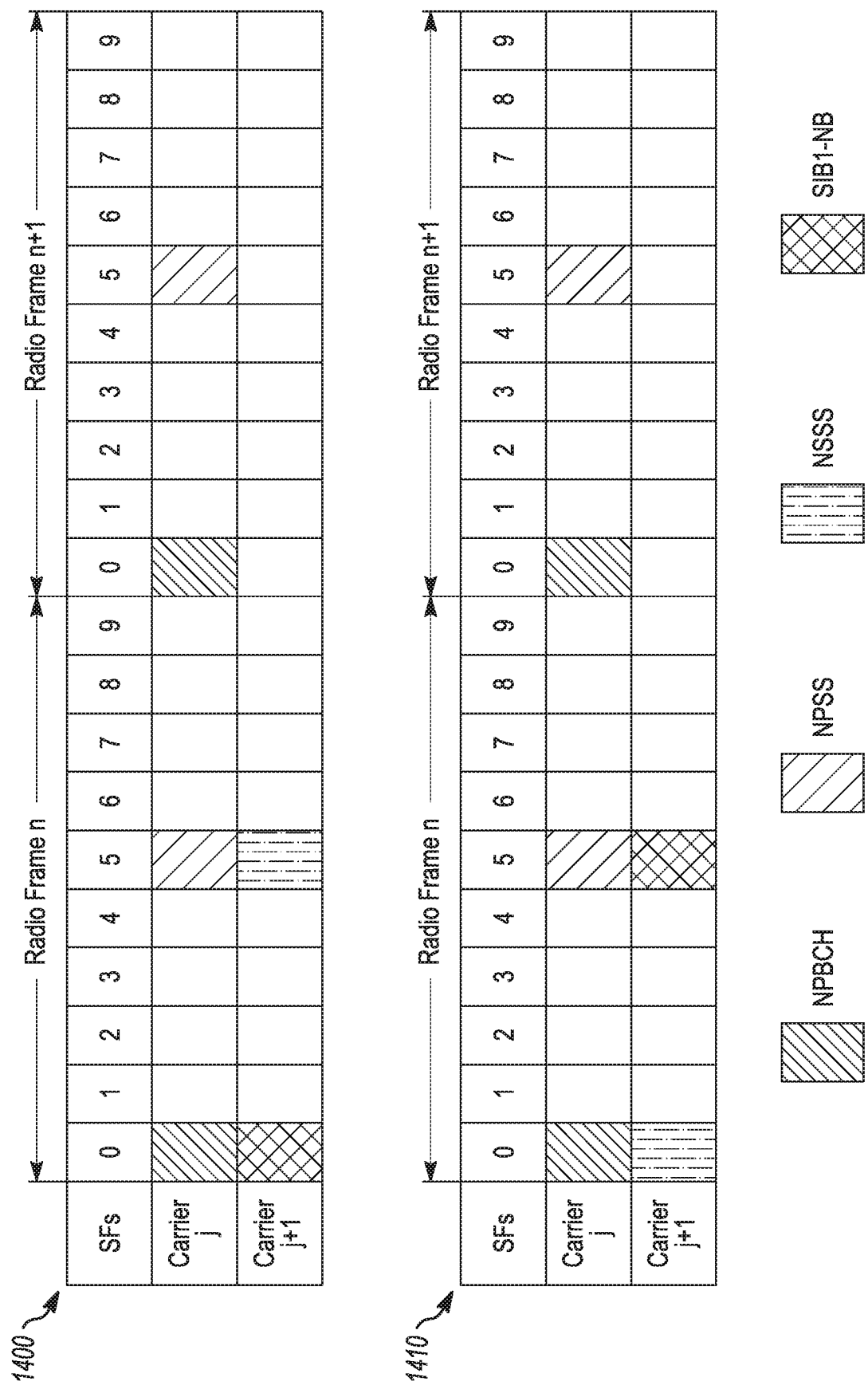

DOWNLINK TRANSMISSION IN TDD SUPPPORTING FENB-IOTS

PRIORITY CLAIM

This application claim priority under 35 USC 119(c) to U.S. Provisional Patent Application Ser. No. 62/544,654, filed Aug. 11, 2017, and to U.S. Provisional Patent Application Ser. No. 62/544,256, filed Aug. 11, 2017, and to U.S. Provisional Patent Application Ser. No. 62/544,262, filed Aug. 11, 2017, and to U.S. Provisional Patent Application Ser. No. 62/565,793, filed Sep. 29, 2017, and to U.S. Provisional Patent Application Ser. No. 62/586,727, filed Nov. 15, 2017, all of which are incorporated herein by reference in their entirety.

TECHNICAL FIELD

Embodiments pertain to wireless communications. Some embodiments relate to wireless networks including 3GPP (Third Generation Partnership Project) networks, 3GPP LTE (Long Term Evolution) networks, and 3GPP LTE-A (LTE Advanced) networks. Some embodiments relate to Fifth Generation (5G) networks. Some embodiments relate to New Radio (NR) networks. Some embodiments relate to further enhanced internet-of-things (feNB IoT) techniques. Some embodiments relate to internet-of-things (IoT) techniques.

BACKGROUND

Mobile devices may exchange data in accordance with time-division duplexing (TDD) arrangements. Such systems may be useful in various scenarios. For instance, when a block of spectrum is available, hut blocks of paired spectrum are not available, a TDD arrangement may be a good option. In some scenarios, different configurations of uplink subframes and downlink subframes within a radio frame may be possible. Allocation of resources and/or scheduling of transmissions for such configurations may be challenging. Accordingly, there is a general need for methods and systems to enable TDD operation in these and other scenarios.

BRIEF DESCRIPTION OF THE DRAWINGS

FIG. 14A and FIG. 14B illustrate additional example configurations and additional example elements that may be transmitted in accordance with some embodiments.

DETAILED DESCRIPTION

The following description and the drawings sufficiently illustrate specific embodiments to enable those skilled in the ail to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Figure 1A:
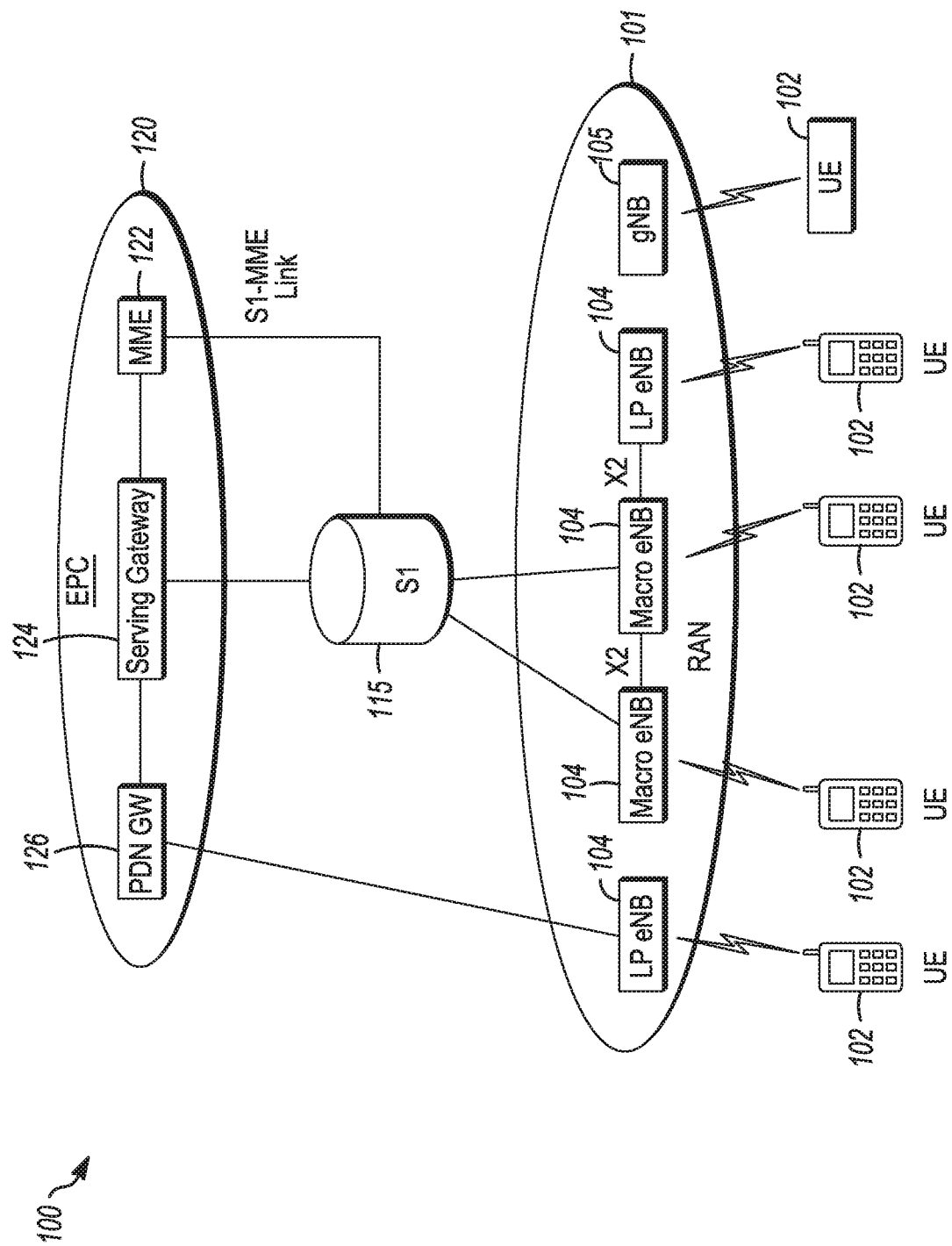
FIG. 1A is a functional diagram of an example network in accordance with some embodiments.
Figure 1B:
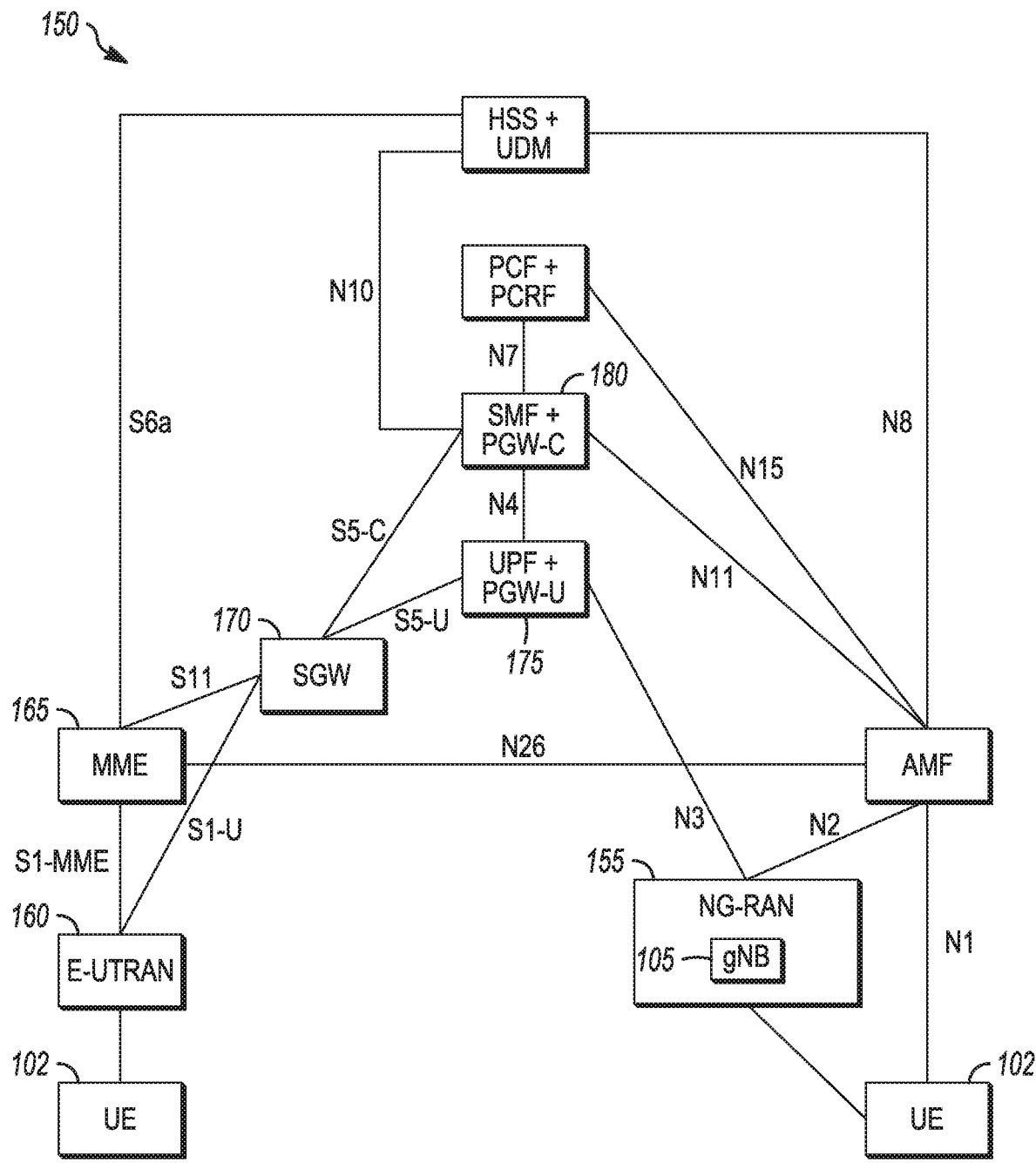
FIG. 1B is a functional diagram of another example network in accordance with some embodiments.

FIG. 1A is a functional diagram of an example network in accordance with some embodiments. FIG. 1B is a functional diagram of another example network in accordance with some embodiments. In references herein, "FIG. 1" may include FIG. 1A and FIG. 1B. In some embodiments, the network 100 may be a Third Generation Partnership Project (3GPP) network. In some embodiments, the network 150 may be a 3GPP network. In a non-limiting example, the network 150 may be a new radio (NR) network. It should be noted that embodiments are not limited to usage of 3GPP networks, however, as other networks may be used in some embodiments. As an example, a Fifth Generation (5G) network may be used in some cases. As another example, a New Radio (NR) network may be used in some cases. As another example, a wireless local area network (WLAN) may be used in some cases. Embodiments are not limited to these example networks, however, as other networks may be used in some embodiments. In some embodiments, a network may include one or more components shown in FIG. 1A. Some embodiments may not necessarily include all components shown in FIG. 1A, and some embodiments may include additional components not shown in FIG. 1A. In some embodiments, a network may include one or more components shown in FIG. 1B. Some embodiments may not necessarily include all components shown in FIG. 1B, and some embodiments may include additional components not shown in FIG. 1B. In some embodiments, a network may include one or more components shown in FIG. 1A and one or more components shown in FIG. 1B. In some embodiments, a network may include one or more components shown in FIG. 1A, one or more components shown in FIG. 1B and one or more additional components.

The network 100 may comprise a radio access network (RAN) 101 and the core network 120 (e.g., shown as an evolved packet core (EPC)) coupled together through an S1 interface 115. For convenience and brevity sake, only a portion of the core network 120, as well as the RAN 101, is shown. In a non-limiting example, the RAN 101 may be an evolved universal terrestrial radio access network (E-UTRAN). In another non-limiting example, the RAN 101 may include one or more components of a New Radio (NR) network. In another non-limiting example, the RAN 101 may include one or more components of an E-UTRAN and one or more components of another network (including but not limited to an NR network).

The core network 120 may include a mobility management entity (MME) 122, a serving gateway (serving GW) 124, and packet data network gateway (PDN GW) 126. In some embodiments, the network 100 may include (and/or support) one or more Evolved Node-B's (eNBs) 104 (which may operate as base stations) for communicating with User Equipment (UE) 102. The eNBs 104 may include macro eNBs and low power (LP) eNBs, in some embodiments.

In some embodiments, the network 100 may include (and/or support) one or more Generation Node-B's (gNBs) 105. In some embodiments, one or more eNBs 104 may be configured to operate as gNBs 105. Embodiments are not limited to the number of eNBs 104 shown in FIG. 1A or to the number of gNBs 105 shown in FIG. 1A. In some embodiments, the network 100 may not necessarily include eNBs 104. Embodiments are also not limited to the connectivity of components shown in FIG. 1A.

It should be noted that references herein to an eNB 104 or to a gNB 105 are not limiting. In some embodiments, one or more operations, methods and/or techniques (such as those described herein) may be practiced by a base station component (and/or other component), including but not limited to a gNB 105, an eNB 104, a serving cell, a transmit receive point (TRP) and/or other. In some embodiments, the base station component may be configured to operate in accordance with a New Radio (NR) protocol and/or NR standard, although the scope of embodiments is not limited in this respect. In some embodiments, the base station component may be configured to operate in accordance with a Fifth Generation (5G) protocol and/or 5G standard, although the scope of embodiments is not limited in this respect.

In some embodiments, one or more of the UEs 102 and/or eNBs 104 may be configured to operate in accordance with an NR protocol and/or NR techniques. References to a UE 102, eNB 104 and/or gNB 105 as part of descriptions herein are not limiting. For instance, descriptions of one or more operations, techniques and/or methods practiced by a gNB 105 are not limiting. In some embodiments, one or more of those operations, techniques and/or methods may be practiced by an eNB 104 and/or other base station component.

In some embodiments, one or more of the UEs 102, eNBs 104 and/or gNBs 105 may be configured to operate in accordance with technique(s), protocol(s) and/or standard(s) related to one or more of: internet-of-things (IoT), narrowband IoT (NB-IoT), enhanced NB IoT (eNB-IoT), further enhanced narrowband IoT (feNB-IoT) and/or other.

In some embodiments, the UE 102 may transmit signals (data, control and/or other) to the gNB 105, and may receive signals (data, control and/or other) from the gNB 105. In some embodiments, the UE 102 may transmit signals (data, control and/or other) to the eNB 104, and may receive signals (data, control and/or other) from the eNB 104. These embodiments will be described in more detail below.

The MME 122 is similar in function to the control plane of legacy Serving GPRS Support Nodes (SGSN). The MME 122 manages mobility aspects in access such as gateway selection and tracking area list management. The serving GW 124 terminates the interface toward the RAN 101, and routes data packets between the RAN 101 and the core network 120. In addition, it may be a local mobility anchor point for inter-eNB handovers and also may provide an anchor for inter-3GPP mobility. Other responsibilities may include lawful intercept, charging, and some policy enforcement. The serving GW 124 and the MME 122 may be implemented in one physical node or separate physical nodes. The PDN GW 126 terminates an SGi interface toward the packet data network (PDN). The PDN GW 126 routes data packets between the EPC 120 and the external PDN, and may be a key node for policy enforcement and charging data collection. It may also provide an anchor point for mobility with non-LTE accesses. The external PDN can be any kind of IP network, as well as an IP Multimedia Subsystem (IMS) domain. The PDN GW 126 and the serving GW 124 may be implemented in one physical node or separated physical nodes.

In some embodiments, the eNBs 104 (macro and micro) terminate the air interface protocol and may be the first point of contact fora UE 102. In some embodiments, an eNB 104 may fulfill various logical functions for the network 100, including but not limited to RNC (radio network controller functions) such as radio bearer management, uplink and downlink dynamic radio resource management and data packet scheduling, and mobility management.

In some embodiments, UEs 102 may be configured to communicate Orthogonal Frequency Division Multiplexing (OFDM) communication signals with an eNB 104 and/or gNB 105 over a multicarrier communication channel in accordance with an Orthogonal Frequency Division Multiple Access (OFDMA) communication technique. In some embodiments, eNBs 104 and/or gNBs 105 may be configured 10 communicate OFDM communication signals with a UE 102 over a multicarrier communication channel in accordance with an OFDM A communication technique. The OFDM signals may comprise a plurality of orthogonal subcarriers.

The S1 interface 115 is the interface that separates the RAN 101 and the EPC 120. It may be split into two parts: the S1-U, which carries traffic data between the eNBs 104 and the serving OW 124, and the S1-MME, which is a signaling interface between the eNBs 104 and the MME 122. The X2 interface is the interface between eNBs 104. The X2 interface comprises two parts, the X2-C and X2-U. The X2-C is the control plane interface between the eNBs 104, while the X2-U is the user plane interface between the eNBs 104.

In some embodiments, similar functionality and/or connectivity described for the eNB 104 may be used for the gNB 105, although the scope of embodiments is not limited in this respect. In a non-limiting example, the S1 interface 115 (and/or similar interface) may be split into two parts: the S1-U, which carries traffic data between the gNBs 105 and the serving GW 124, and the S1-MME, which is a signaling interface between the gNBs 104 and the MME 122. The X2 interface (and/or similar interface) may enable communication between eNBs 104, communication between gNBs 105 and/or communication between an eNB 104 and a gNB 105.

With cellular networks, LP cells are typically used to extend coverage to indoor areas where outdoor signals do not reach well, or to add network capacity in areas with very dense phone usage, such as train stations. As used herein, the term low power (LP) eNB refers to any suitable relatively low power eNB for implementing a narrower cell (narrower than a macro cell) such as a femtocell, a picocell, or a micro cell. Femtocell eNBs are typically provided by a mobile network operator to its residential or enterprise customers. A femtocell is typically the size of a residential gateway or smaller and generally connects to the user's broadband line. Once plugged in, the femtocell connects to the mobile operator's mobile network and provides extra coverage in a range of typically 30 to 50 meters for residential femtocells. Thus, a LP eNB might be a femtocell eNB since it is coupled through the PDN GW 126. Similarly, a picocell is a wireless communication system typically covering a small area, such as in building (offices, shopping malls, train stations, etc.), or more recently in-aircraft. A picocell eNB can generally connect through the X2 link to another eNB such as a macro eNB through its base station controller (BSC) functionality. Thus, LP eNB may be implemented with a picocell eNB since it is coupled to a macro eNB via an X2 interface. Picocell eNBs or other LP eNBs may incorporate some or all functionality of a macro eNB. In some cases, this may be referred to as an access point base station or enterprise femtocell. In some embodiments, various types of gNBs 105 may be used, including but not limited to one or more of the eNB types described above.

In some embodiments, the network 150 may include one or more components configured to operate in accordance with one or more 3GPP standards, including but not limited to an NR standard. The network 150 shown in FIG. 1B may include a next generation RAN (NG-RAN) 155, which may include one or more gNBs 105. In some embodiments, the network 150 may include the E-UTRAN 160, which may include one or more eNBs. The E-UTRAN 160 may be similar to the RAN 101 described herein, although the scope of embodiments is not limited in this respect.

In some embodiments, the network 150 may include the MME 165. The MME 165 may be similar to the MME 122 described herein, although the scope of embodiments is not limited in this respect. The MME 165 may perform one or more operations or functionality similar to those described herein regarding the MME 122, although the scope of embodiments is not limited in this respect.

In some embodiments, the network 150 may include the SGW 170. The SGW 170 may be similar to the SGW 124 described herein, although the scope of embodiments is not limited in this respect. The SGW 170 may perform one or more operations or functionality similar to those described herein regarding the SGW 124, although the scope of embodiments is not limited in this respect.

In some embodiments, the network 150 may include component(s) and/or module(s) for functionality for a user plane function (UPF) and user plane functionality for PGW (PGW-U), as indicated by 175. In some embodiments, the network 150 may include component(s) and/or module(s) for functionality for a session management function (SMF) and control plane functionality for PGW (PGW-C), as indicated by 180. In some embodiments, the component(s) and/or module(s) indicated by 175 and/or 180 may be similar to the PGW 126 described herein, although the scope of embodiments is not limited in this respect. The component(s) and/or module(s) indicated by 175 and/or 180 may perform one or more operations or functionality similar to those described herein regarding the PGW 126, although the scope of embodiments is not limited in this respect. One or both of the components 170, 172 may perform at least a portion of the functionality described herein for the PGW 126, although the scope of embodiments is not limited in this respect.

Embodiments are not limited to the number or type of components shown in FIG. 1B. Embodiments are also not limited to the connectivity of components shown in FIG. 1B.

In some embodiments, a downlink resource grid may be used for downlink transmissions from an eNB 104 to a UE 102, while uplink transmission from the UE 102 to the eNB 104 may utilize similar techniques. In some embodiments, a downlink resource grid may be used for downlink transmissions from a gNB 105 to a UE 102, while uplink transmission from the UE 102 to the gNB 105 may utilize similar techniques. The grid may be a time-frequency grid, called a resource grid or time-frequency resource grid, which is the physical resource in tire downlink in each slot. Such a time-frequency plane representation is a common practice for OFDM systems, which makes it intuitive for radio resource allocation. Each column and each row of the resource grid correspond to one OFDM symbol and one OFDM subcarrier, respectively. The duration of the resource grid in the time domain corresponds to one slot in a radio frame. The smallest time frequency unit in a resource grid is denoted as a resource element (RE). There are several different physical downlink channels that are conveyed using such resource blocks. With particular relevance to this disclosure, two of these physical downlink channels are the physical downlink shared channel and the physical down link control channel.

As used herein, the term "circuitry" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality. In some embodiments, the circuitry may be implemented in, or functions associated with the circuitry may be implemented by, one or more software or firmware modules. In some embodiments, circuitry may include logic, at least partially operable in hardware. Embodiments described herein may be implemented into a system using any suitably configured hardware and/or software.

Figure 2:
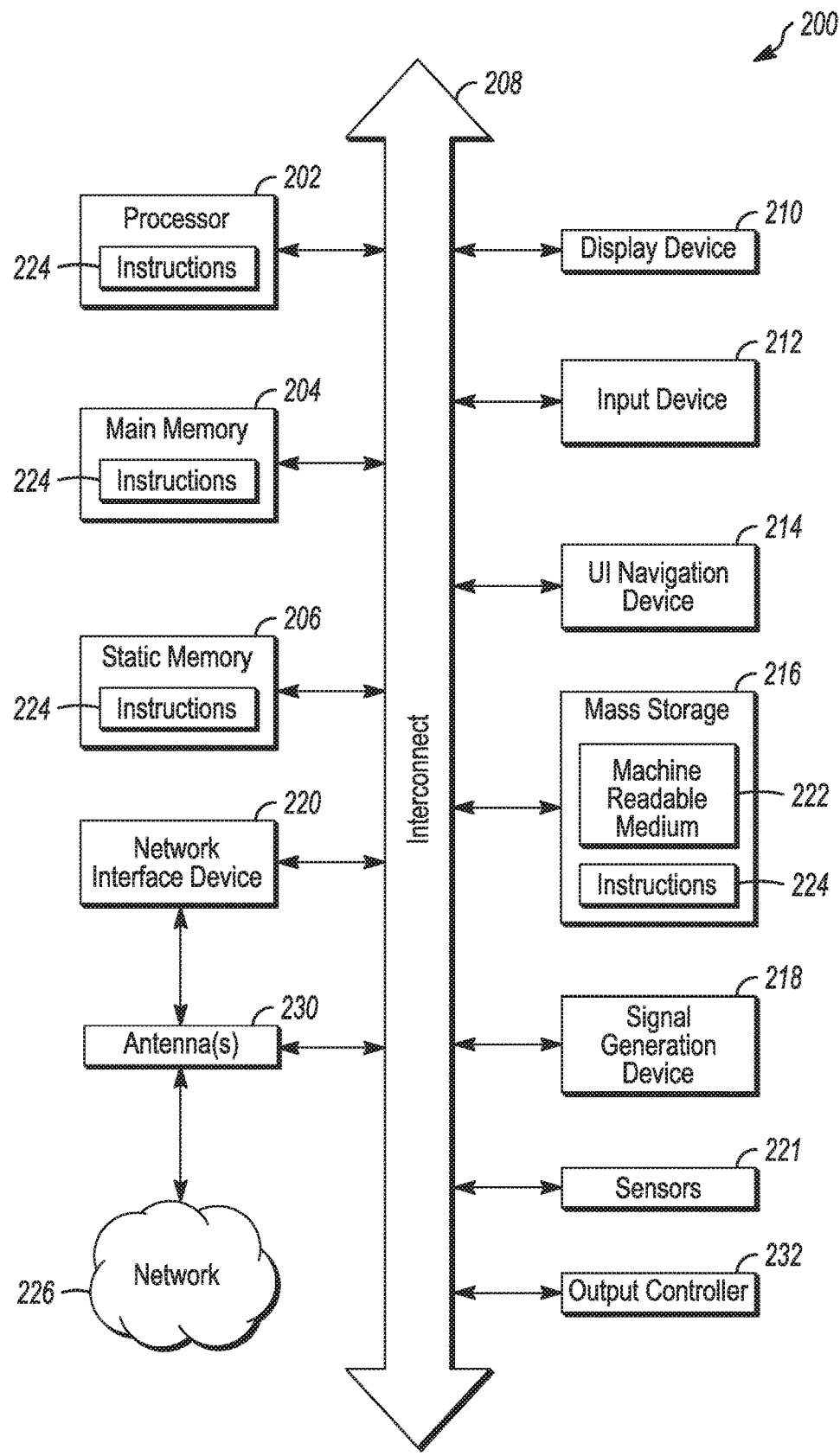
FIG. 2 illustrates a block diagram of an example machine in accordance with some embodiments.

FIG. 2 illustrates a block diagram of an example machine in accordance with some embodiments. The machine 200 is an example machine upon which any one or more of the techniques and/or methodologies discussed herein may be performed. In alternative embodiments, the machine 200 may operate as a standalone device or may be connected (e.g., networked) to other machines. In a networked deployment, the machine 200 may operate in the capacity of a server machine, a client machine, or both in server-client network environments. In an example, the machine 200 may act as a peer machine in peer-to-peer (P2P) (or other distributed) network environment. The machine 200 may be a UE 102, eNB 104, gNB 105, access point (AP), station (STA), user, device, mobile device, base station, personal computer (PC), a tablet PC, a set-top box (STB), a personal digital assistant (PDA), a mobile telephone, a smart phone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples as described herein, may include, or may operate on, logic or a number of components, modules, or mechanisms. Modules are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine readable medium. In an example, the software, when executed by the underlying hardware of the module, causes the hardware to perform the specified operations.

Accordingly, the term "module" is understood to encompass a tangible entity, be that an entity that is physically constructed, specifically configured (e.g., hardwired), or temporarily (e.g., transitorily) configured (e.g., programmed) (o operate in a specified manner or to perform part or all of any operation described herein. Considering examples in which modules are temporarily configured, each of the modules need not be instantiated at any one moment in time. For example, where the modules comprise a general-purpose hardware processor configured using software, the general purpose hardware processor may be configured as respective different modules at different times. Software may accordingly configure a hardware processor, for example, to constitute a particular module at one instance of time and to constitute a different module at a different instance of time.

The machine (e.g., computer system) 200 may include a hardware processor 202 (e.g., a central processing unit (CPU), a graphics processing unit (GPU), a hardware processor core, or any combination thereof), a main memory 204 and a static memory 206, some or all of which may communicate with each other via an interlink (e.g., bus) 208. The machine 200 may further include a display unit 210, an alphanumeric input device 212 (e.g., a keyboard), and a user interface (UI) navigation device 214 (e.g., a mouse). In an example, the display unit 210, input device 212 and UI navigation device 214 may be a touch screen display. The machine 200 may additionally include a storage device (e.g., drive unit) 216, a signal generation device 218 (e.g., a speaker), a network interface device 220, and one or more sensors 221, such as a global positioning system (GPS) sensor, compass, accelerometer, or other sensor. The machine 200 may include an output controller 228, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 216 may include a machine readable medium 222 on which is stored one or more sets of data structures or instructions 224 (e.g., software) embodying or utilized by any one or more of the techniques or functions described herein. The instructions 224 may also reside, completely or at least partially, within the main memory 204, within static memory 206, or within the hardware processor 202 during execution thereof by the machine 200. In an example, one or any combination of the hardware processor 202, the main memory 204, the static memory 206, or the storage device 216 may constitute machine readable media. In some embodiments, the machine readable medium may be or may include a non-transitory computer-readable storage medium. In some embodiments, the machine readable medium may be or may include a computer-readable storage medium.

While the machine readable medium 222 is illustrated as a single medium, the term "machine readable medium" may include a single medium or multiple media (e.g., a centralized or distributed database, and/or associated caches and servers) configured to store the one or more instructions 224. The term "machine readable medium" may include any medium that is capable of storing, encoding, or carrying instructions for execution by the machine 200 and that cause the machine 200 to perform any one or more of the techniques of the present disclosure, or that is capable of storing, encoding or carrying data structures used by or associated with such instructions. Non limiting machine readable medium examples may include solid-state memories, and optical and magnetic media. Specific examples of machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto optical disks; Random Access Memory (RAM); and CD-ROM and DVD-ROM disks. In some examples, machine readable media may include non-transitory machine readable media. In some examples, machine readable media may include machine readable media that is not a transitory propagating signal.

The instructions 224 may further be transmitted or received over a communications network 226 using a transmission medium via the network interface device 220 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®). IEEE 802.15.4 family of standards, a Long Term Evolution (LTE) family of standards, a Universal Mobile Telecommunications System (UMTS) family of standards, peer-to-peer (P2P) networks, among others. In an example, the network interface device 220 may include one or more physical jacks (e.g., Ethernet, coaxial, or phone jacks) or one or more antennas to connect to the communications network 226. In an example, the network interface device 220 may include a plurality of antennas to wirelessly communicate using at least one of single-input multiple-output (SIMO), multiple-input multiple-output (MIMO), or multiple-input single-output (MISO) techniques. In some examples, the network interface device 220 may wirelessly communicate using Multiple User MIMO techniques. The term "transmission medium" shall be taken to include any intangible medium that is capable of storing, encoding or carrying instructions for execution by the machine 200, and includes digital or analog communications signals or other intangible medium to facilitate communication of such software.

Figure 3:
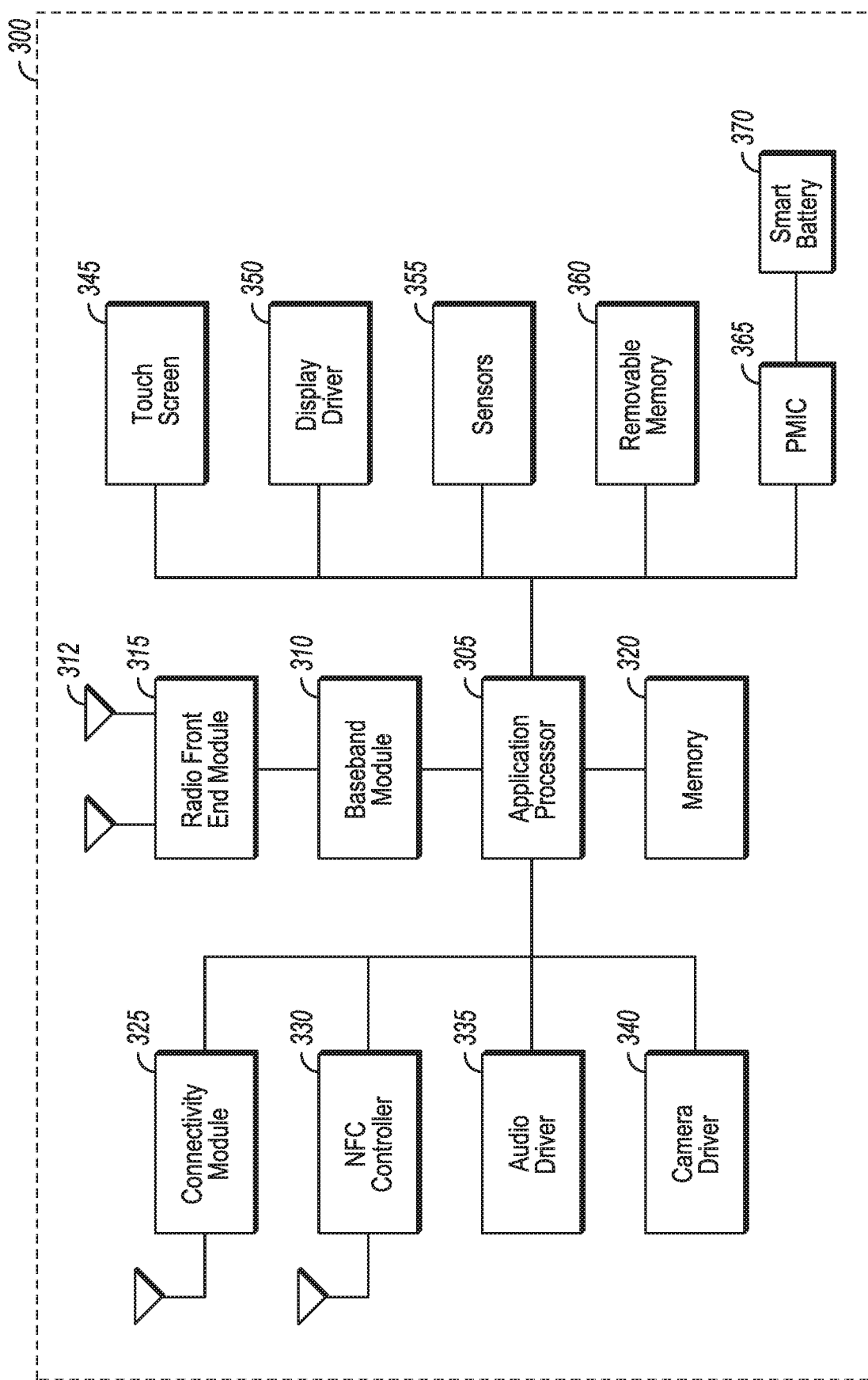
FIG. 3 illustrates a user device in accordance with some aspects.

FIG. 3 illustrates a user device in accordance with some aspects. In some embodiments, the user device 300 may be a mobile device. In some embodiments, the user device 300 may be or may be configured to operate as a User Equipment (UE). In some embodiments, the user device 300 may be arranged to operate in accordance with a new radio (NR) protocol. In some embodiments, the user device 300 may be arranged to operate in accordance with a Third Generation Partnership Protocol (3GPP) protocol. The user device 300 may be suitable for use as a UE 102 as depicted in FIG. 1, in some embodiments. It should be noted that in some embodiments, a UE, an apparatus of a UE, a user device or an apparatus of a user device may include one or more of the components shown in one or more of FIGS. 2, 3, and 5. In some embodiments, such a UE, user device and/or apparatus may include one or more additional components.

In some aspects, the user device 300 may include an application processor 305, baseband processor 310 (also referred to as a baseband module), radio front end module (RFEM) 315, memory 320, connectivity module 325, near field communication (NFC) controller 330, audio driver 335, camera driver 340, touch screen 345, display driver 350, sensors 355, removable memory 360, power management integrated circuit (PMIC) 365 and smart battery 370. In some aspects, the user device 300 may be a User Equipment (UE).

In some aspects, application processor 305 may include, for example, one or more CPU cores and one or more of cache memory, low drop-out voltage regulators (LDOs), interrupt controllers, serial interlaces such as serial peripheral interface (SPI), inter-integrated circuit ($I^2C$) or universal programmable serial interface module, real time clock (RTC), timer-counters including interval and watchdog timers, general purpose input-output (IO), memory card controllers such as secure digital/multi-media card (SD/MMC) or similar, universal serial bus (USB) interfaces, mobile industry processor interface (MIPI) interfaces and Joint Test Access Group (JTAG) test access ports.

In some aspects, baseband module 310 may be implemented, for example, as a solder-down substrate including one or more integrated circuits, a single packaged integrated circuit soldered to a main circuit board, and/or a multi-chip module containing two or more integrated circuits.

Figure 4:
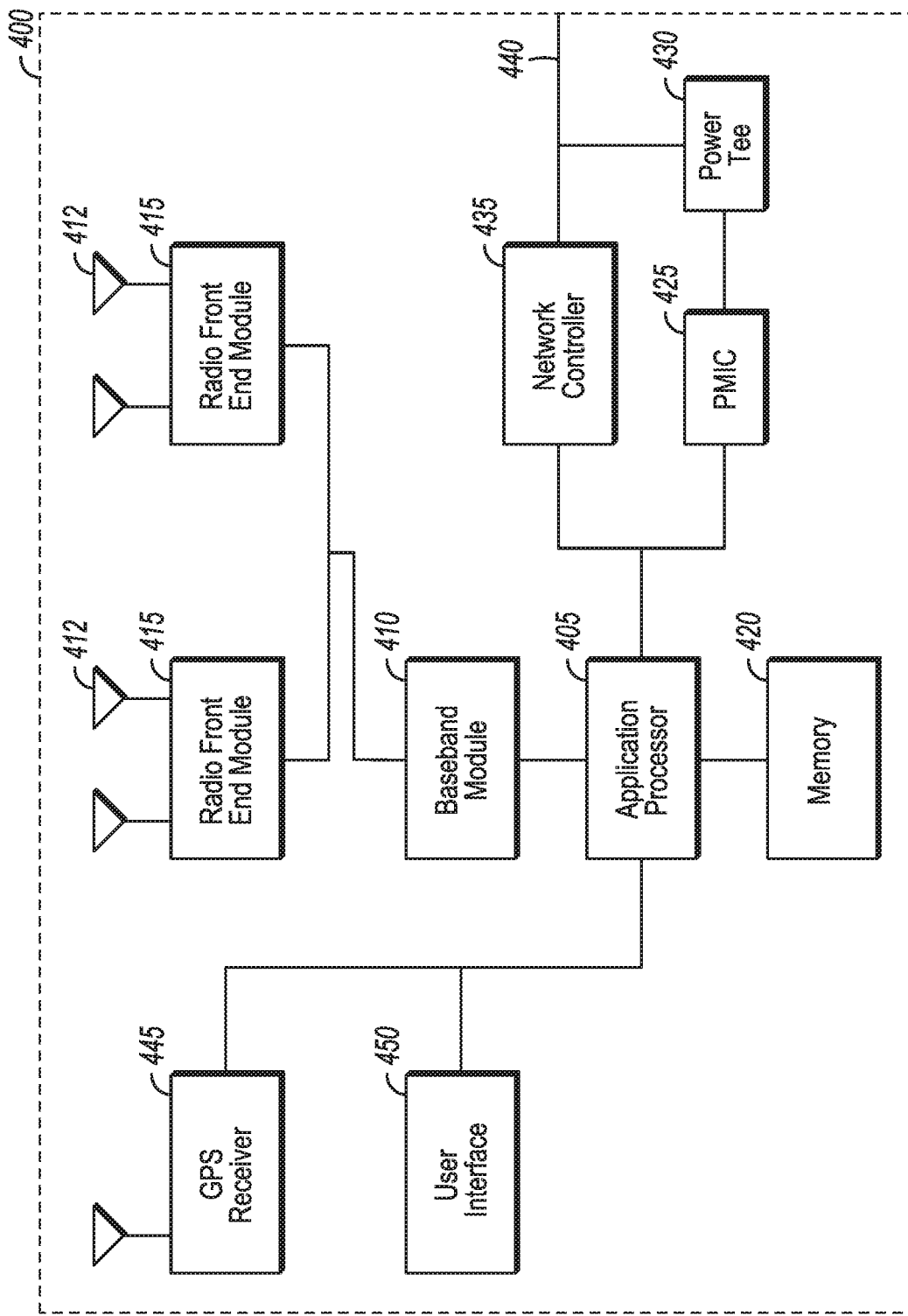
FIG. 4 illustrates a base station in accordance with some aspects.

FIG. 4 illustrates a base station in accordance with some aspects. In some embodiments, the base station 400 may be or may be configured to operate as an Evolved Node-B (eNB). In some embodiments, the base station 400 may be or may be configured to operate as a Generation Node-B (gNB). In some embodiments, the base station 400 may be arranged to operate in accordance with a new radio (NR) protocol. In some embodiments, the base station 400 may be arranged to operate in accordance with a Third Generation Partnership Protocol (3GPP) protocol. It should be noted that in some embodiments, the base station 400 may be a stationary non mobile device. The base station 400 may be suitable for use as an eNB 104 as depicted in FIG. 1, in some embodiments. The base station 400 may be suitable for use as a gNB 105 as depicted in FIG. 1, in some embodiments. It should be noted that in some embodiments, an eNB, an apparatus of an eNB, a gNB, an apparatus of a gNB, a base station and/or an apparatus of a base station may include one or more of the components shown in one or more of FIGS. 2, 4, and 5. In some embodiments, such an eNB, gNB, base station and/or apparatus may include one or more additional components.

FIG. 4 illustrates a base station or infrastructure equipment radio head 400 in accordance with an aspect. The base station 400 may include one or more of application processor 405, baseband modules 410, one or more radio front end modules 415, memory 420, power management circuitry 425, power tee circuitry 430, network controller 435, network interface connector 440, satellite navigation receiver module 445, and user interface 450. In some aspects, the base station 400 may be an Evolved Node-B (eNB), which may be arranged to operate in accordance with a 3GPP protocol, new radio (NR) protocol and/or Fifth Generation (5G) protocol. In some aspects, the base station 400 may be a generation Node-B (gNB), which may be arranged to operate in accordance with a 3GFP protocol, new radio (NR) protocol and/or Fifth Generation (5G) protocol.

In some aspects, application processor 405 may include one or more CPU cores and one or more of cache memory, low drop-out voltage regulators (LDOs), interrupt controllers, serial interfaces such as SPI, $I^2C$ or universal programmable serial interface module, real time clock (RTC), timer counters including interval and watchdog timers, general purpose IO, memory card controllers such as SD/MMC or similar, USB interfaces, MIPI interfaces and Joint Test Access Group (JTAG) test access ports.

In some aspects, baseband processor 410 may be implemented, for example, as a solder-down substrate including one or more integrated circuits, a single packaged integrated circuit soldered to a main circuit board or a multi-chip module containing two or more integrated circuits.

In some aspects, memory 420 may include one or more of volatile memory including dynamic random access memory (DRAM) and/or synchronous dynamic random access memory (SDRAM), and nonvolatile memory (NVM) including high-speed electrically erasable memory (commonly referred to as Flash memory), phase change random access memory (PRAM), magneto-resistive random access memory (MRAM) and/or a three-dimensional cross-point memory. Memory 420 may be implemented as one or more of solder down packaged integrated circuits, socketed memory modules and plug-in memory cards.

In some aspects, power management integrated circuitry 425 may include one or more of voltage regulators, surge protectors, power alarm detection circuitry and one or more backup power sources such as a battery or capacitor. Power alarm detection circuitry may detect one or more of brown out (under-voltage) and surge (over-voltage) conditions.

In some aspects, power tee circuitry 430 may provide for electrical power drawn front a network cable to provide both power supply and data connectivity to the base station 400 using a single cable. In some aspects, network controller 435 may provide connectivity to a network using a standard network interface protocol such as Ethernet. Network connectivity may be provided using a physical connection which is one of electrical (commonly referred to as copper interconnect), optical or wireless.

In some aspects, satellite navigation receiver module 445 may include circuitry to receive and decode signals transmitted by one or more navigation satellite constellations such as the global positioning system (GPS), Globalnaya Navigatsionnaya Sputnikovaya Sistema (GLONASS), Galileo and/or BeiDou. The receiver 445 may provide data to application processor 405 which may include one or more of position data or time data. Application processor 405 may use time data to synchronize operations with other radio base stations. In some aspects, user interface 450 may include one or more of physical or virtual buttons, such as a reset button, one or more indicators such as light emitting diodes (LEDs) and a display screen.

Figure 5:
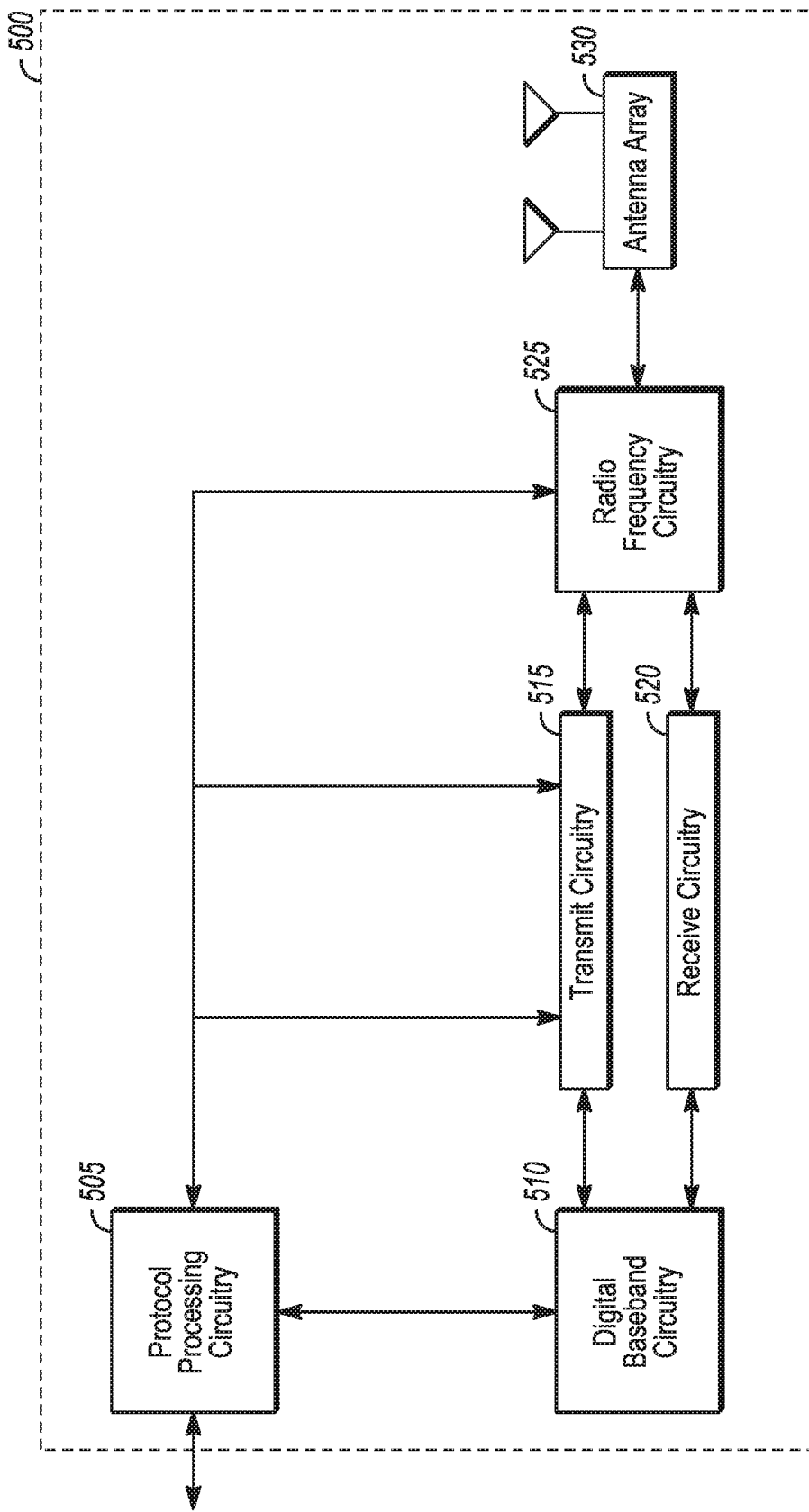
FIG. 5 illustrates an exemplary communication circuitry according to some aspects.

FIG. 5 illustrates an exemplary communication circuitry according to some aspects. Circuitry 500 is alternatively grouped according to functions. Components as shown in 500 are shown here for illustrative purposes and may include other components not shown here in FIG. 5. In some aspects, the communication circuitry 500 may be used for millimeter wave communication, although aspects are not limited to millimeter wave communication. Communication at any suitable frequency may be performed by the communication circuitry 500 in some aspects.

It should be noted that a device, such as a UE 102, eNB 104, gNB 105, the user device 300, the base station 400, the machine 200 and/or other device may include one or more components of the communication circuitry 500, in some aspects.

The communication circuitry 500 may include protocol processing circuitry 505, which may implement one or more of medium access control (MAC), radio link control (RLC), packet data convergence protocol (PDCP), radio resource control (RRC) and non-access stratum (NAS) functions. Protocol processing circuitry 505 may include one or more processing cores (not shown) to execute instructions and one or more memory structures (not shown) to store program and data information.

The communication circuitry 500 may further include digital baseband circuitry 510, which may implement physical layer (PHY) functions including one or more of hybrid automatic repeat request (HARQ) functions, scrambling and/or descrambling, coding and/or decoding, layer mapping and/or de-mapping, modulation symbol mapping, received symbol and/or bit metric determination, multi-antenna port pre-coding and/or decoding which may include one or more of space time, space-frequency or spatial coding, reference signal generation and/or detection, pre-amble sequence generation and/or decoding, synchronization sequence generation and/or detection, control channel signal blind decoding, and other related functions.

The communication circuitry 500 may further include transmit circuitry 515, receive circuitry 520 and/or antenna array circuitry 530. The communication circuitry 500 may further include radio frequency (RF) circuitry 525. In an aspect of the disclosure, RF circuitry 525 may include multiple parallel RF chains for one or more of transmit or receive functions, each connected to one or more antennas of the antenna array 530.

In an aspect of the disclosure, protocol processing circuitry 505 may include one or more instances of control circuitry (not shown) to provide control functions for one or more of digital baseband circuitry 510, transmit circuitry 515, receive circuitry 520, and/or radio frequency circuitry 525

In some embodiments, processing circuitry may perform one or more operations described herein and/or other operation(s). In a non-limiting example, the processing circuitry may include one or more components such as the processor 202, application processor 305, baseband module 310, application processor 405, baseband module 410, protocol processing circuitry 505, digital baseband circuitry 510, similar component(s) and/or other component(s).

In some embodiments, a transceiver may transmit one or more elements (including but not limited to those described herein) and/or receive one or more elements (including but not limited to those described herein). In a non-limiting example, the transceiver may include one or more components such as the radio front end module 315, radio front end module 415, transmit circuitry 515, receive circuitry 520, radio frequency circuitry 525, similar component(s) and/or other component(s).

One or more antennas (such as 230, 312, 412, 530 and/or others) may comprise one or more directional or omnidirectional antennas, including, for example, dipole antennas, monopole antennas, patch antennas, loop antennas, microstrip antennas or other types of antennas suitable for transmission of RF signals. In some multiple-input multiple-output (MIMO) embodiments, one or more of the antennas (such as 230, 312, 412, 530 and/or others) may be effectively separated to take advantage of spatial diversity and the different channel characteristics that may result.

In some embodiments, the UE 102, eNB 104, gNB 105, user device 300, base station 400, machine 200 and/or other device described herein may be a mobile device and/or portable wireless communication device, such as a personal digital assistant (PDA), a laptop or portable computer with wireless communication capability, a web tablet, a wireless telephone, a smartphone, a wireless headset, a pager, an instant messaging device, a digital camera, an access point, a television, a wearable device such as a medical device (e.g., a heart rate monitor, a blood pressure monitor, etc.), or other device that may receive and/or transmit information wirelessly. In some embodiments, the UK 102, eNB 104, gNB 105, user device 300, base station 400, machine 200 and/or other device described herein may be configured to operate in accordance with 3GPP standards, although the scope of the embodiments is not limited in this respect. In some embodiments, the UK 102, eNB 104, gNB 105, user device 300, base station 400, machine 200 and/or other device described herein may be configured to operate in accordance with new radio (NR) standards, although the scope of the embodiments is not limited in this respect. In some embodiments, the UK 102, eNB 104, gNB 105, user device 300, base station 400, machine 200 and/or other device described herein may be configured to operate according to other protocols or standards, including IEEE 802.11 or other IEEE standards. In some embodiments, the UE 102, eNB 104, gNB 105, user device 300, base station 400, machine 200 and/or other device described herein may include one or more of a keyboard, a display, a non-volatile memory port, multiple antennas, a graphics processor, an application processor, speakers, and other mobile device elements. The display may be an LCD screen including a touch screen.

Although the UE 102, eNB 104, gNB 105, user device 300, base station 400, machine 200 and/or other device described herein may each be illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements may refer to one or more processes operating on one or more processing elements.

Embodiments may be implemented in one or a combination of hardware, firmware and software. Embodiments may also be implemented as instructions stored on a computer-readable storage device, which may be read and executed by at least one processor to perform the operations described herein. A computer-readable storage device may include any non-transitory mechanism for storing information in a form readable by a machine (e.g., a computer). For example, a computer-readable storage device may include read-only memory (ROM), random-access memory (RAM), magnetic disk storage media, optical storage media, flash-memory devices, and other storage devices and media. Some embodiments may include one or more processors and may be configured with instructions stored on a computer readable storage device.

It should be noted that in some embodiments, an apparatus used by the UE 102, eNB 104, gNB 105, machine 200, user device 300 and/or base station 400 may include various components shown in FIGS. 2-5. Accordingly, techniques and operations described herein that refer to the UE 102 may be applicable to an apparatus of a UE. In addition, techniques and operations described herein that refer to the eNB 104 may be applicable to an apparatus of an eNB. In addition, techniques and operations described herein that refer to the gNB 105 may be applicable to an apparatus of a gNB.

Figure 6:
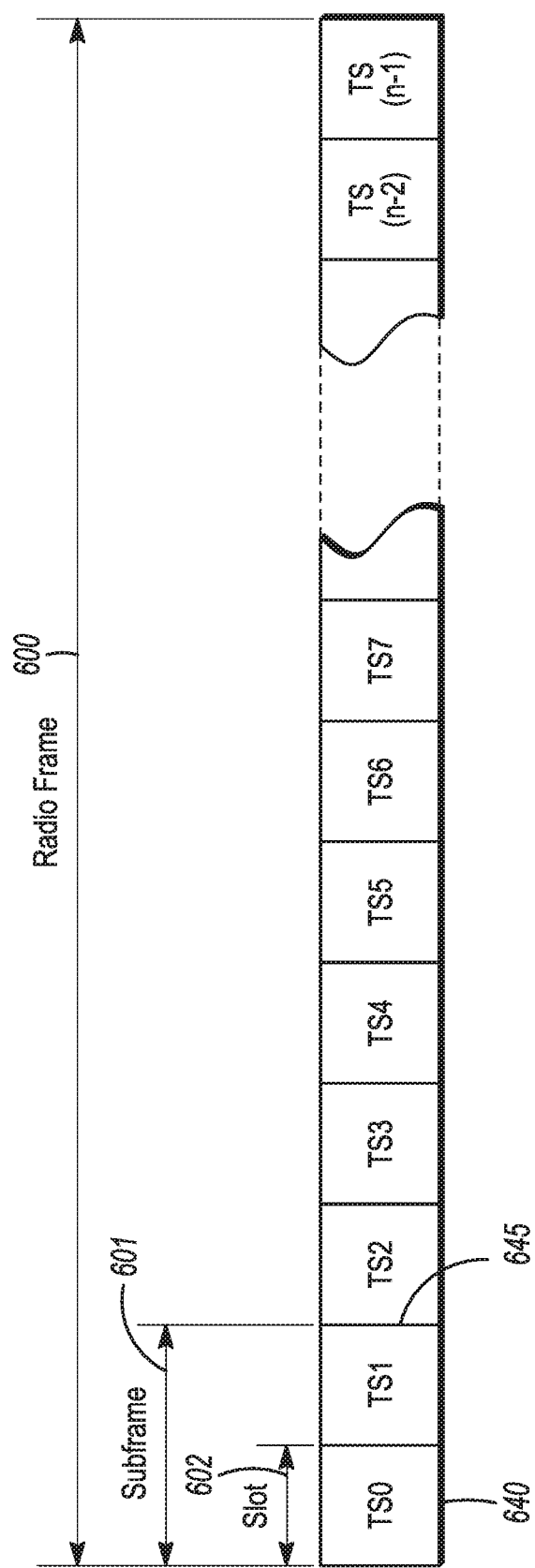
FIG. 6 illustrates an example of a radio frame structure in accordance with some embodiments.
Figure 7A:
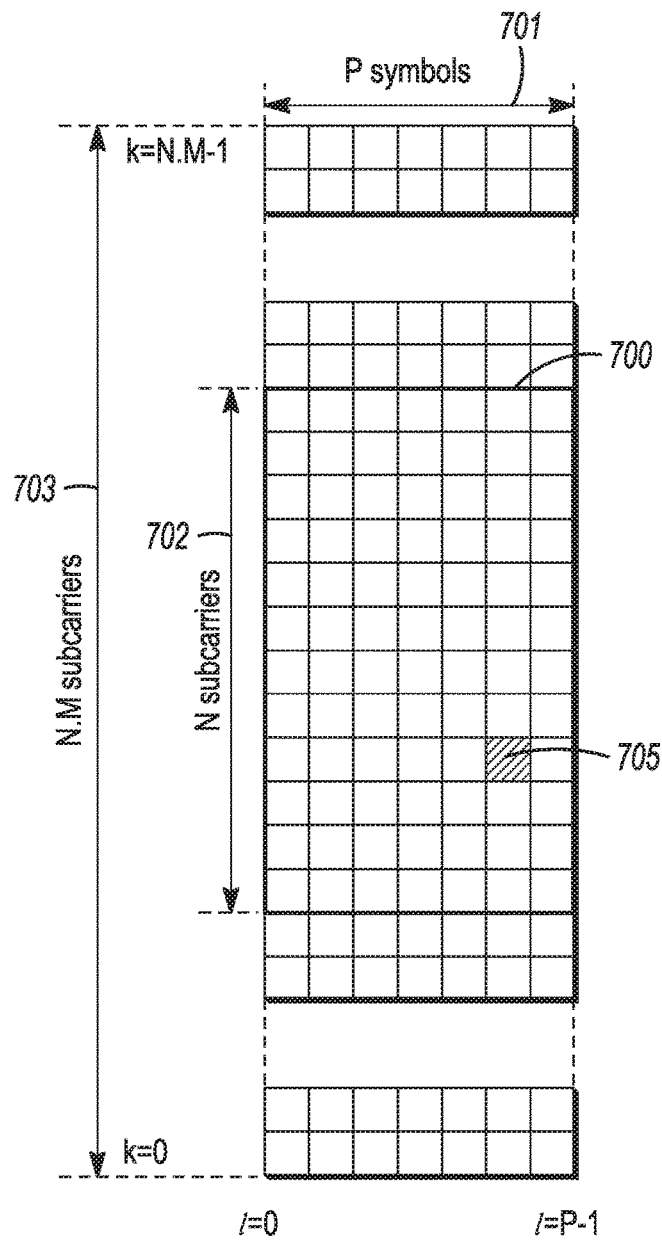
FIG. 7A and FIG. 7B illustrate example frequency resources in accordance with some embodiments.
Figure 7B:
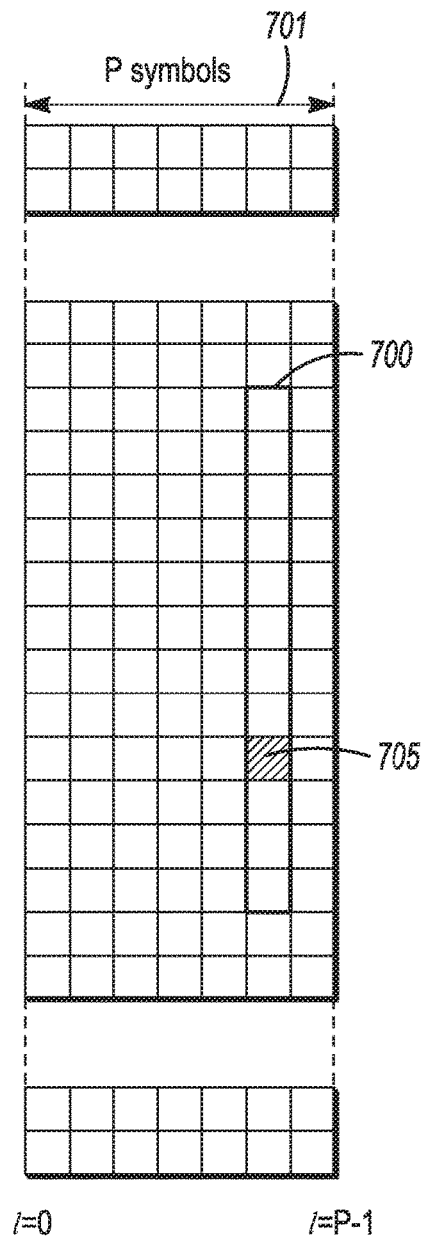

FIG. 6 illustrates an example of a radio frame structure in accordance with some embodiments. FIGS. 7A and 7B illustrate example frequency resources in accordance with some embodiments. In references herein, "FIG. 7" may include FIG. 7A and FIG. 7B. It should be noted that the examples shown in FIGS. 6-7 may illustrate some or all of the concepts and techniques described herein in some cases, but embodiments are not limited by the examples. For instance, embodiments are not limited by the name, number, type size, ordering, arrangement and/or other aspects of the time resources, symbol periods, frequency resources, PRBs and other elements as shown in FIGS. 6-7. Although some of the elements shown in the examples of FIGS. 6-7 may be included in a 3GPP LTE standard, 5G standard, NR standard and/or other standard, embodiments are not limited to usage of such elements that are included in standards.

An example of a radio frame structure that may be used in some aspects is shown in FIG. 6. In this example, radio frame 600 has a duration of 10 ms. Radio frame 600 is divided into slots 602 each of duration 0.5 ms, and numbered from 0 to 19. Additionally, each pair of adjacent slots 602 numbered 2i anti 2i+1, where i is an integer, is referred to as a subframe 601.

In some aspects using the radio frame format of FIG. 6, each subframe 601 may include a combination of one or more of downlink control information, downlink data information, uplink control information and uplink data information. The combination of information types and direction may be selected independently for each subframe 602.

Referring to FIGS. 7A and 7B, in some aspects, a sub component of a transmitted signal consisting of one subcarrier in the frequency domain and one symbol interval in the time domain may be termed a resource element. Resource elements may be depicted in a grid form as shown in FIG. 7A and FIG. 7B.

In some aspects, illustrated in FIG. 7A, resource elements may be grouped into rectangular resource blocks 700 consisting of 12 subcarriers in the frequency domain and the P symbols in the time domain, where P may correspond to the number of symbols contained in one slot, and may be 6, 7, or any other suitable number of symbols.

In some alternative aspects, illustrated in FIG. 7B, resource elements may be grouped into resource blocks 700 consisting of 12 subcarriers (as indicated by 702) in the frequency domain and one symbol in the time domain. In the depictions of FIG. 7A and FIG. 7B, each resource element 705 may be indexed as (k, l) where k is the index number of subcarrier, in the range 0 to N·M−1 (as indicated by 703), where N is the number of subcarriers in a resource block, and M is the number of resource blocks spanning a component carrier in the frequency domain.

In accordance with some embodiments, the UE 102 may receive, from a gNB 105, a narrowband physical downlink control channel (NPDCCH) that indicates a number of narrowband internet-of-things (NB-IoT) downlink subframes for a downlink scheduling delay of a narrowband physical downlink shared channel (NPDSCH) in one or more radio frames configured for time-division duplexing (TDD) operation. Subframes of the one or more radio frames may include uplink subframes, NB-IoT downlink subframes for downlink NB-IoT transmissions, and downlink subframes for other downlink transmissions. The UE 102 may determine the downlink scheduling delay based on a count of NB-IoT downlink subframes elapsed since an end of the NPDCCH. The downlink scheduling delay may be determined based on an earliest subframe for which a count of NB-IoT downlink subframes is equal to the number of NB-IoT downlink subframes indicated in the NPDCCH. These embodiments are described in more detail below.

Figure 8:
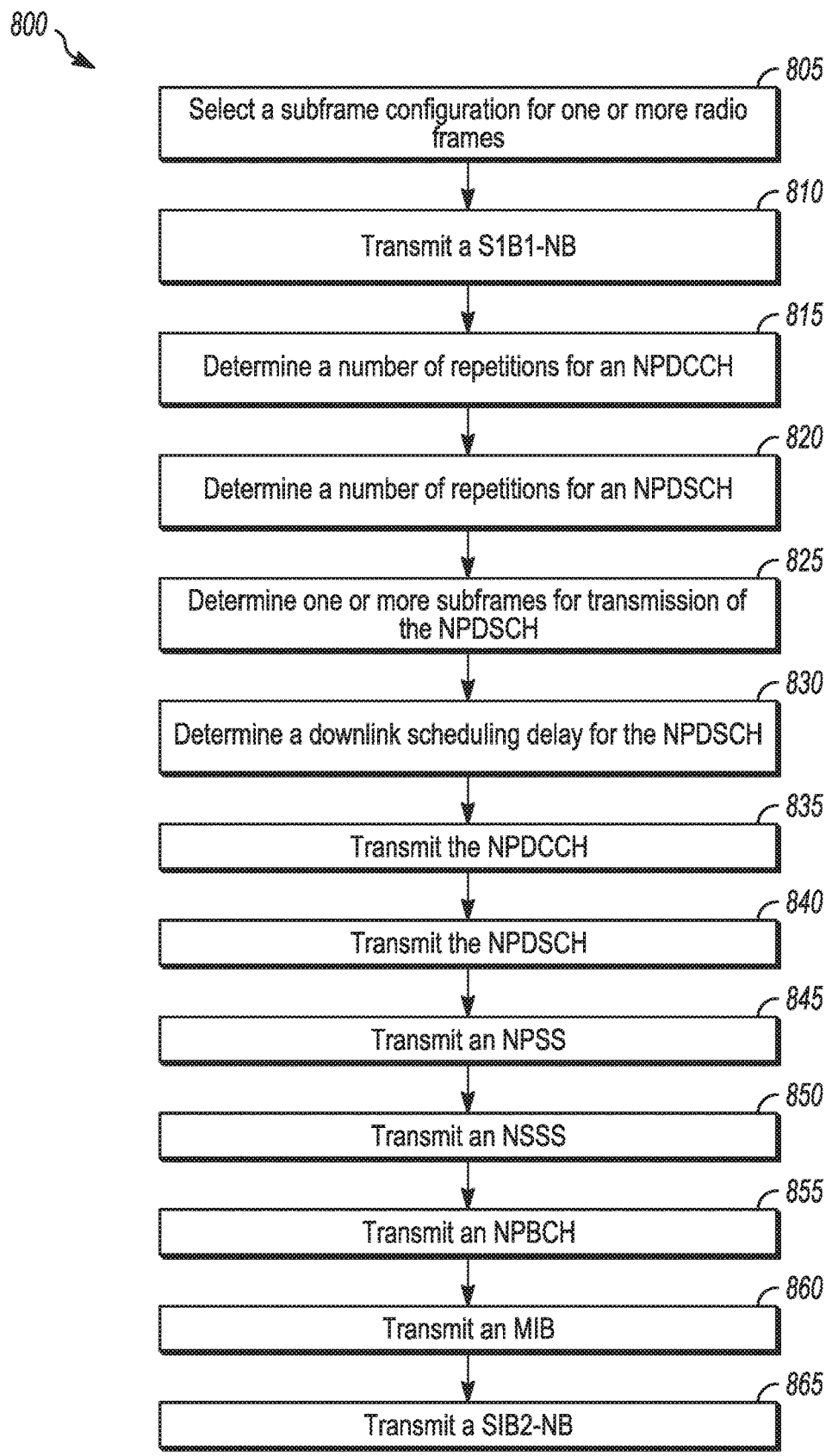
FIG. 8 illustrates the operation of a method of communication in accordance with some embodiments.
Figure 9:
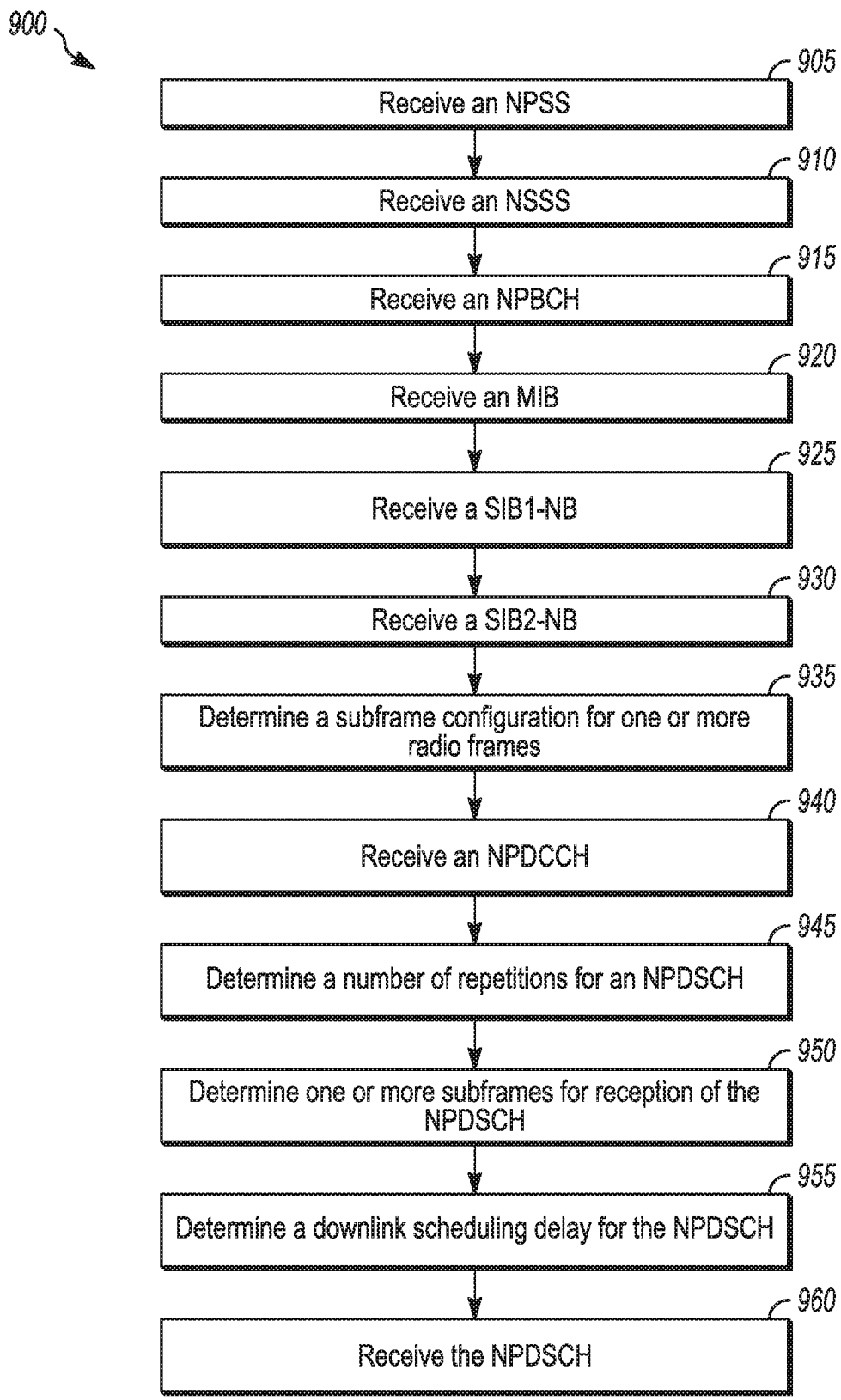
FIG. 9 illustrates the operation of another method of communication in accordance with some embodiments.

FIG. 8 illustrates the operation of a method of communication in accordance with some embodiments. FIG. 9 illustrates the operation of another method of communication in accordance with some embodiments. In describing the methods 800 and 900, reference may be made to one or more of FIGS. 1-15, although it is understood that the methods 800 and 900 may be practiced with any other suitable systems, interfaces and components. In some cases, descriptions herein of one or more of the concepts, operations and/or techniques regarding one of the methods described herein (800, 900 and/or other) may be applicable to at least one of the other methods described herein (800, 900 and/or other).

Some embodiments of the method 800 may include additional operations in comparison to what is illustrated in FIG. 8, including but not limited to operations described herein. Some embodiments of the method 800 may not necessarily include all of the operations shown in FIG. 8. In addition, embodiments of the method 800 are not necessarily limited to the chronological order that is shown in FIG. 8. In some embodiments, a gNB 105 may perform one or more operations of the method 800, but embodiments are not limited to performance of the method 800 and/or operations of it by the gNB 105. Accordingly, although references may be made to performance of one or more operations of the method 800 by the gNB 105 in descriptions herein, it is understood that the eNB 104, UE 102 and/or other device may perform one or more operations that may be the same as, similar to and/or reciprocal to one or more of the operations of the method 800, in some embodiments.

Some embodiments of the method 900 may include additional operations in comparison to what is illustrated in FIG. 9, including but not limited to operations described herein. Some embodiments of the method 900 may not necessarily include all of the operations shown in FIG. 9. In addition, embodiments of the method 900 are not necessarily limited to the chronological order that is shown in FIG. 9. In some embodiments, a UE 102 may perform one or more operations of the method 900, but embodiments are not limited to performance of the method 900 and/or operations of it by the UE 102. Accordingly, although references may be made to performance of one or more operations of the method 900 by the UE 102 in descriptions herein, it is understood that the eNB 104, gNB 105 and/or other device may perform one or more operations that may be the same as, similar to and/or reciprocal to one or more of the operations of the method 900, in some embodiments.

In some cases, operations and techniques described as part of the method 800 may be relevant to the method 900. In some cases, operations and techniques described as part of the method 900 may be relevant to the method 800. In addition, embodiments of the method 900 may include one or more operations that may be the same as, similar to or reciprocal to one or more operations of the method 800 (and/or other operation(s) described herein). For instance, an operation of the method 800 may include transmission of an element (such as a frame, block, message and/or other) by the gNB 105 and the method 900 may include reception of a same or similar element by the UE 102.

In some cases, one or more concepts described regarding one of the methods 800 and 900 may be relevant to one or more of the other methods described herein. Such concepts may include, but are not limited to, NPDCCH, NPDSCH, NPBCH, NPSS, NSSS, SIB1-NB, MIB, SIB2-NB, subframe configurations and/or other concepts.

While the methods 800 and 900 and other methods described wherein may refer to eNBs 104, gNBs 105 or UEs 102 operating in accordance with 3GPP standards, 5G standards, NR standards, feNB-IoT standards and/or other standards, embodiments of those methods are not limited to just those eNBs 104, gNBs 105 or UEs 102 and may also be practiced on other devices, such as a Wi-Fi access point (AP) or user station (STA). In addition, the methods 800, 900 and other methods described herein may be practiced by wireless devices configured to operate in other suitable types of wireless communication systems, including systems configured to operate according to various IEEE standards such as IEEE 802.11. The methods 800, 900 and other methods described herein may also be applicable to an apparatus of a UE 102, an apparatus of an eNB 104, an apparatus of a gNB 105 and/or an apparatus of another device described above.

It should also be noted that embodiments are not limited by references herein (such as in descriptions of the methods 800, 900 and/or other descriptions herein) to transmission, reception and/or exchanging of elements such as frames, messages, requests, indicators, signals or other elements. In some embodiments, such an element may be generated, encoded or otherwise processed by processing circuitry (such as by a base band processor included in the processing circuitry) for transmission. The transmission may be performed by a transceiver or other component, in some cases. In some embodiments, such an element may be decoded, detected or otherwise processed by the processing circuitry (such as by the baseband processor). The element may be received by a transceiver or other component, in some cases. In some embodiments, the processing circuitry and the transceiver may be included in a same apparatus. The scope of embodiments is not limited in this respect, however, as the transceiver may be separate from the apparatus that comprises the processing circuitry, in some embodiments.

One or more of the messages described herein may be included in a standard and/or protocol, including but not limited to Third Generation Partnership Project (3GPP), 3GPP Long Term Evolution (LTE), Fourth Generation (4G), Fifth Generation (5G), New Radio (NR), feNB-IoT and/or other. The scope of embodiments is not limited to usage of elements that are included in standards, however.

In some embodiments, the UE 102 may be arranged to operate in accordance with a further enhanced narrowband internet-of-things (feNB-IoT) protocol although the scope of embodiments is not limited in this respect. In some embodiments, the gNB 105 may be arranged to operate in accordance with a further enhanced narrowband internet-of-things (feNB-IoT) protocol, although the scope of embodiments is not limited in this respect.

At operation 805, the gNB 105 may select a subframe configuration for one or more radio frames. In some embodiments, the radio frames may be configured for time-division duplexing (TDD) operation. In some embodiments, subframes of the radio frames may include uplink subframes, NB-IoT downlink subframes, and downlink subframes. In some embodiments, the NB-IoT downlink subframes may be allocated for downlink NB-IoT transmissions and the downlink subframes may be allocated for transmissions other than NB-IoT downlink transmissions. In some embodiments, subframes of the radio frames may include uplink subframes and downlink subframes.

In some embodiments, the subframe configuration may include one or more uplink subframes, one or more NB-IoT downlink subframes and/or one or more downlink subframes. In some embodiments, the subframe configuration may include one or more special subframes.

In some embodiments, the special subframe may occur immediately after one of the downlink NB IoT subframes and immediately before one of the uplink subframes. In some embodiments, the special subframe may occur immediately after one of the downlink subframes and immediately before one of the uplink subframes. In some embodiments, one or more special subframes may be included in the radio frame. Each of those special subframes may be immediately after a downlink subframe and/or NB-IoT downlink subframe and immediately before an uplink subframe. In some embodiments, the special subframe may include a downlink portion (DwPTS), followed by a guard period (GP), followed by an uplink portion (UpPTS).

In some embodiments, the gNB 105 may select the subframe configuration for the radio frame from a plurality of candidate subframe configurations. In a non-limiting example, the gNB 105 may select the subframe configuration for the radio frame based on one or more of: an amount of downlink data to be transmitted to one or more UEs 102, an amount of uplink data to be transmitted by the one or more UEs 102 and/or other factor(s).

In some embodiments, at least one of the candidate subframe configurations may include one or more uplink subframes, one or more downlink subframes and/or NB-IoT downlink subframes, and a special subframe. In some embodiments, at least one of the candidate subframe configurations may include one or more uplink subframes, one or more downlink subframes and/or NB-IoT downlink subframes, and one or more special subframes. In some embodiments, at least one of the candidate subframe configurations may be configurable to include two or more special subframes.

In some embodiments, for each of the candidate subframe configurations, the radio frame may include ten subframes, comprising: one or more uplink subframes, at least four downlink subframes and/or NB-IoT downlink subframes, and a special subframe. For instance, subframe configurations that include less than four downlink subframes and/or NB-IoT downlink subframes may not be included in the candidate subframe configurations, in some embodiments.

In some embodiments, for each of the candidate subframe configurations, at least the subframes indexed by zero live, and nine may be allocated as NB IoT downlink subframes and/or downlink subframes.

At operation 810, the gNB 105 may transmit a system information block type-1 narrowband (SIB1-NB). In some embodiments, the SIB1-NB may indicate a subframe configuration for the radio frames. In some embodiments, the SIB1-NB may include configuration information, in addition to or instead of the selected subframe configuration. In some embodiments, the SIB1-NB may include system information.

It should be noted that embodiments are not limited to usage of the SIB1-NB for operation 810, as other elements (including other types of SIBs) may be used, in some embodiments. The SIB1-NB may be included in a 3GPP protocol and/or feNB-IoT protocol, in some embodiments. It should be noted that embodiments are not limited to usage of the SIB1-NB this operation and/or other operations described herein, as any suitable element may be used.

In some embodiments, the SIB1-NB may include a plurality of configuration bits. At least some values of the plurality of configuration bits may be reserved to indicate different candidate subframe configurations for TDD operation for the radio frames. In a non-limiting example, if N configuration bits are included in the SIB1-NB, any number of the 2^N values may be used to indicate subframe configurations for TDD operation. In some embodiments, a mapping between values of the configuration bits and predetermined subframe configurations may be used. The mapping may be pan of a standard, part of a protocol and/or predetermined, in some embodiments. Control signaling transmitted by the gNB 105 may indicate the mapping, in some embodiments.

In some embodiments, the SIB1-NB may include a plurality of configuration bits. One value of the plurality of configuration bits may be reserved to indicate frequency division duplexing (FDD) operation for the radio frames. At least some other values of the plurality of configuration bits may be reserved to indicate different candidate subframe configurations for TDD operation for the radio frames. In a non-limiting example, if N configuration hits are included in the SIB1-NB, one value may be reserved to indicate FDD operation. As 2^N values are possible for the N configuration bits, any number of the other 2^N−1 values may be used to indicate subframe configurations for TDD operation. In some embodiments, a mapping between values of the configuration bits and predetermined subframe configurations may be used. The mapping may be part of a standard, part of a protocol and/or predetermined, in some embodiments. Control signaling transmitted by the gNB 105 may indicate the mapping, in some embodiments.

At operation 815, the gNB 105 may determine a number of repetitions for a narrowband physical downlink control channel (NPDCCH). In some embodiments, the gNB 105 may determine the number of repetitions for the NPDCCH based at least partly on one or more of: a target decoding performance level at the UE 102, a target performance level at the UE 102, a target signal quality level at the UE 102, a level of coverage enhancement and/or other factor(s).

At operation 820, the gNB 105 may determine a number of repetitions for a narrowband physical downlink shared channel (NPDSCH). In some embodiments, the gNB 105 may determine the number of repetitions for the NPDSCH based at least partly on one or more of: a target decoding performance level at the UE 102, a target performance level at the UE 102, a target signal quality level at the UE 102, a level of coverage enhancement and/or other factor(s).

In some embodiments, the gNB 105 may determine the number of repetitions for the NPDCCH and the number of repetitions for the NPDSCH independently. In some embodiments, the determination of the number of repetitions for the NPDCCH and the determination of the number of repetitions for the NPDSCH may be related, combined and/or dependent. In some embodiments, the gNB 105 may determine the number of repetitions for the NPDCCH and the number of repetitions for the NPDSCH jointly. Accordingly, the two independent numbers of repetitions may not necessarily be performed in those embodiments. In some embodiments, the number of repetitions for the NPDCCH and the number of repetitions for the NPDSCH may be the same. For instance, the gNB 105 may determine one number of repetitions, and may apply it to both the NPDCCH and the NPDSCH. In some embodiments, the number of repetitions for the NPDCCH and the number of repetitions for the NPDSCH may be potentially different.

In a non limiting example, the number of repetitions for the NPDCCH may be included in 2, 4, 8, 16, 32, 48, 64, and 128, or may be included in 2, 4, 8, 16, 32, 64, 128, 256, 512, 1048, and 2096. In another non-limiting example, the number of repetitions for the NPDSCH may be included in 1, 2, 4, 8, 16, 32, 64, 128, 192, 256, 384, 512, 768, 1024, 1536, and 2048. In another non limiting example, a number of repetitions for the NPDCCH may be included in 1, 2, 4, 8, 16, 32, 64, 128, 256, 512, 1024, 2048. Embodiments are not limited to the example numbers of repetitions given above, as any suitable number of repetitions may be used. Any suitable number of values may be used. All of the values given above may not necessarily be included in some embodiments. In some embodiments, one or more of the values given above may be used. In some embodiments, one or more additional values may be used. In some embodiments, one or more values may be used in addition to or instead of one or more of the values given above. The example values given above may be included in a 3GPP standard. NB-IoT standard, an feNB-IoT standard and/or other standard, although the scope of embodiments is not limited in this respect.

In a non-limiting example, a stalling subframe parameter (which may be referred to, without limitation, as "G") may be used to define a starting subframe of NPDCCH as the subframe that satisfies the relationship below. $(10n_f + \lfloor n_s/2 \rfloor) \bmod T = \lfloor \alpha_{offset} T \rfloor$ In the above, $n_f$ is the radio frame number, $n_s$ is the slot number, $T = R_{max} * G$, and $\alpha_{offset} = \{0, 1/8, 1/4, 3/8\}$. In some embodiments, these values may be increased in comparison to values supported in Rel-13 NB-IoT. For example, the maximum supported value can be 128 or 256. In a non-limiting example, the G can be one of 2, 4, 8, 16, 32, 48, 64, 128. In another non-limiting example, the G may be one of 1.5, 2, 4, 8, 16, 32, 48, 64, 128, 256. In another non-limiting example, one or more values of the parameter G used in a protocol (including but not limited to a Rel-13 protocol) may be used. In some cases, a set of candidate values for the number of symbol groups may include one or more of those values, and may also include one or more additional values (such as 128, 256 and/or other).

At operation 825, the gNB 105 may determine one or more subframes to be used for transmission of the NPDSCH. At operation 830, the gNB 105 may determine a downlink scheduling delay for the NPDSCH. At operation 835, the gNB 105 may transmit the NPDCCH. At operation 840, the gNB 105 may transmit the NPDSCH.

In some embodiments, the gNB 105 may select one or more subframes of the radio frames for the transmission of the NPDSCH. In some embodiments, the selected radio frames may or may not include the special subframe. One or more factors may be used to determine which subframes are to be used, including hut not limited to: an amount of data to be transmitted, a number of NB-IoT downlink subframes in the radio frame, a number of downlink subframes in the radio frame, a number of symbol periods in the DwPTS and/or other factor(s).

In some embodiments, the NPDCCH may include one or more of: the number of repetitions to be used for the transmission of the NPDSCH, time resources to be used for the transmission of the NPDSCH, schedule information, frequency resources to be used for the transmission of the NPDSCH, Configuration information and/or other information. In some embodiments, the NPDCCH may schedule transmission of the NPDSCH.

In some embodiments, the NPDCCH may include information related to the scheduling delay for the NPDSCH. In some embodiments, the NPDCCH may indicate a number of NB-IoT downlink subframes for the downlink scheduling delay. In some embodiments, the NPDCCH may indicate a number of downlink subframes for the downlink scheduling delay.

In some embodiments, the downlink scheduling delay may be based on a count of subframes elapsed since the NPDCCH. The count of subframes may include NB-IoT downlink subframes and may exclude uplink subframes and other subframes which are not defined as NB-IoT downlink subframes (such as downlink subframes allocated for downlink transmissions other than NB-IoT downlink transmissions). The downlink scheduling delay may be determined based on an earliest subframe for which the count of NB-IoT downlink subframes is equal to the scheduling delay indicated in the NPDCCH.

In some embodiments, the NPDCCH may indicate a number of NB-IoT downlink subframes for the downlink scheduling delay. The downlink scheduling delay may be basal on an earliest subframe for which a number of NB-IoT downlink subframes that has elapsed since the end of NPDCCH is equal to the number of NB-IoT downlink subframes indicated in the NPDCCH.

In some embodiments, the gNB 105 may encode the NPDSCH in accordance with a maximum transport block size (TBS) of 1000 bits or 2536 bits. Embodiments are not limited to these example sizes, as any suitable size(s) may be used.

In some embodiments, the gNB 105 may encode the NPDSCH for transmission in accordance with the downlink scheduling delay. In some embodiments, the gNB 105 may encode multiple repetitions of the NPDSCH. In some embodiments, a first chronological repetition of the NPDSCH may be transmitted in accordance with the downlink scheduling delay.

At operation 845, the gNB 105 may transmit a narrowband primary synchronization signal (NPSS). At operation 850, the gNB 105 may transmit a narrowband secondary synchronization signal (NSSS). At operation 855, the gNB 105 may transmit a narrowband physical broadcast channel (NPBCM). At operation 860, the gNB 105 may transmit a master information block (MIB). In some embodiments, the MIB may be included in the NPBCH. In some embodiments, the NPBCH may include the MIB. At operation 865, the gNB 105 may transmit a system information block type-2 narrowband (SIB2-NB).

In some embodiments, the SIB1-NB may indicate a subframe configuration for live radio frames. The radio frames may include ten subframes indexed in a range of zero to nine. In each radio frame, the subframe indexed by five may include an NPSS. In alternate radio frames, the subframe indexed by zero may include an NSSS.

In some embodiments, the radio frames may include ten subframes indexed in a range of zero to nine. In each radio frame, the subframe indexed by five may include an NPSS. A pair of consecutive radio frames may include a first radio frame and a second radio frame. In the first radio frame of the pair, the subframe indexed by zero may include an NSSS and may exclude SIB1-NBs. In the second radio frame of the pair, the subframe indexed by zero may include an SIB1-NB and may exclude NSSSs.

In some embodiments, the radio frames may be indexed by system frame numbers (SFNs). The radio frames may include ten subframes indexed in a range of zero to nine. The subframe indexed by zero in the radio frames of even SFNs may include an NSSS. The subframe indexed by zero in the radio frames of odd SFNs may include an SIB1-NB.

In some embodiments, the radio frames may be indexed by SFNs. The radio frames may include ten subframes indexed in a range of zero to nine. The subframe indexed by zero in the radio frames of even SFNs may include an NSSS and may exclude SIB1-NBs. The subframe indexed by zero in the radio frames of odd SFNs may include an SIB1-NB and may exclude NSSSs. In some embodiments, the subframe indexed by nine may include a narrowband physical broadcast channel (NPBCH).

In some embodiments, the radio frames may include ten subframes indexed in a range of zero to nine. The radio frames may be indexed by SFNs. The gNB 105 may transmit, in the radio frames in the subframe indexed by five, an NPSS. The gNB 105 may transmit, in the radio frames of even RFNs and in the subframe indexed by zero, an NSSS. The gNB 105 may transmit, in the radio frames of odd SFNs and in the subframe indexed by zero, an SIB1-NB.

In some embodiments, the gNB 105 may transmit, on a first carrier, an SIB1-NB. The SIB1-NB may indicate transmission, by the gNB 105, of a system information block type-2 narrowband (SIB2-NB) on a second carrier. In some embodiments, the gNB 105 may encode the SIB2-NB to indicate frequency resources allocated for narrowband physical random access channel (NPRACH) transmissions.

In some embodiments, the gNB 105 may transmit, on a first carrier, an NPSS and a master information block (MIB). In some embodiments, the MIB may indicate a second carrier on which an SIB1-NB is transmitted by the gNB 105. The gNB 105 may transmit the SIB1-NB on the second carrier. In some embodiments, the first carrier may be an anchor carrier, and the second carrier may be a non-anchor carrier. The gNB 105 may encode the MIB to include one or more bits to indicate that the second carrier is used for transmission of the SIB1-NB.

In some embodiments, one physical resource block (PRB) may be used for transmission in accordance with the feNB-IoT protocol/technique. The scope of embodiments is not limited to usage of one PRB, however, as any suitable frequency resources may be used. It should be noted that descriptions herein of some operations and/or techniques may refer to PRBs, symbol periods and/or sub-frames, but such references are not limiting. In some embodiments, other time resources and/or frequency resources may be used in one or more of those operations and/or techniques.

In some embodiments, an apparatus of a gNB 105 may comprise memory. The memory may be configurable to store at least a portion of the NPDCCH. The memory may stoic one or more other elements and the apparatus may use them for performance of one or more operations. The apparatus may include processing circuitry, which may perform one or more operations (including but not limited to operations) of the method 800 and/or other methods described herein). The processing circuitry may include a baseband processor. The baseband circuitry and/or the processing circuitry may perform one or more operations described herein, including but not limited to encoding of the NPDCCH. The apparatus may include a transceiver to transmit the NPDCCH. The transceiver may transmit and/or receive other blocks, messages and/or other elements.

At operation 905, the UE 102 may receive an NPSS. At operation 910, the UE 102 may receive an NSSS. At operation 915, the UE 102 may receive an NPBCH. At operation 920, the UE 102 may receive an MIB. In some embodiments, the NPBCH may carry the MIB. In some embodiments, the NPBCH may include the MIB. At operation 925, the UE 102 may receive an SIB1-NB. At operation 930, the UE 102 may receive a SIB2-NB.

In some embodiments, the SIB1-NB may indicate a subframe configuration for a radio frame configured for time-division duplexing (TDD) operation. The subframe configuration may comprise: one or more NB IoT downlink subframes, one or more downlink subframes, one or more uplink subframes, and/or one or more special subframes. In some embodiments, a special subframe may occur immediately after one of the NB-IoT downlink subframes and immediately before one of the uplink subframes. In some embodiments, uplink subframes may be allocated for uplink transmissions, the NB IoT downlink subframes may be allocated for NB IoT downlink transmissions, the downlink subframes may be allocated for downlink transmissions (such as downlink transmissions other than NB-IoT downlink transmissions). The special subframe may be allocated to enable one or more of: a transition between downlink transmission(s) and uplink transmission(s), and a transition between NB-IoT downlink transmission(s) and uplink transmission(s). In some embodiments, the SIB1-NB may indicate a subframe configuration for a radio frame configured for time-division duplexing (TDD) operation. The subframe configuration may comprise: one or more downlink subframes, one or more uplink subframes, and a special subframe that occurs immediately after one of the downlink subframes and immediately before one of the uplink subframes. In some embodiments, uplink subframes may be allocated for uplink transmissions, the downlink subframes may be allocated for downlink transmissions, and the special subframe may be allocated to enable a transition between the downlink transmissions and the uplink transmissions.

At operation 935, the UK 102 may determine a subframe configuration for a radio frame. In some embodiments, the subframe configuration for the radio frame may be determined based on the SIB1-NB indication, although the scope of embodiments is not limited in this respect.

At operation 940, the UK 102 may receive an NPDCCH. In some embodiments, the NPDCCH may indicate a number of repetitions of an NPDSCH sent at least partly in the special subframe. In some embodiments, the NPDCCH may indicate one or more subframes to be used for reception of the NPDSCH. In some embodiments, the NPDCCH may indicate one or more subframes used for transmission, by tire gNB 105, of the NPDSCH. In some embodiments, the NPDCCH may indicate a number of downlink subframes for a downlink scheduling delay for the NPDSCH.

At operation 945, the UE 102 may determine the number of repetitions for an NPDSCH. In some embodiments, the UK 102 may determine the number of repetitions for an NPDSCH based at least partly on the information indicated by NPDCCH, although the scope of embodiments is not limited in this respect.

At operation 950, the UE 102 may determine one or more subframes for reception of the NPDSCH. In some embodiments, the UE 102 may determine the one or more subframes for reception of the NPDSCH based at least partly on the indication information in NPDCCH, although the scope of embodiments is not limited in this respect. At operation 955, the UE 102 may determine a scheduling delay for the NPDSCH based at least partly on the indication information in NPDCCH. Previously described techniques and/or techniques described herein may be used for operation 955, although the scope of embodiments is not limited in this respect. At operation 960, the UE 102 may receive the NPDSCH.

In some embodiments, an apparatus of a UE 102 may comprise memory. The memory may be configurable to store at least a portion of the NPDCCH. The memory may store one or more other elements and the apparatus may use them for performance of one or more operations. The apparatus may include processing circuitry, which may perform one or more operations (including but not limited to operation(s) of the method 900 and/or other methods described herein). The processing circuitry may include a baseband processor. The baseband circuitry and/or the processing circuitry may perform one or more operations described herein, including but not limited to decoding of the NPDCCH. The apparatus may include a transceiver to receive the NPDCCH. The transceiver may transmit and/or receive other blocks, messages and/or other elements.

Figure 10:
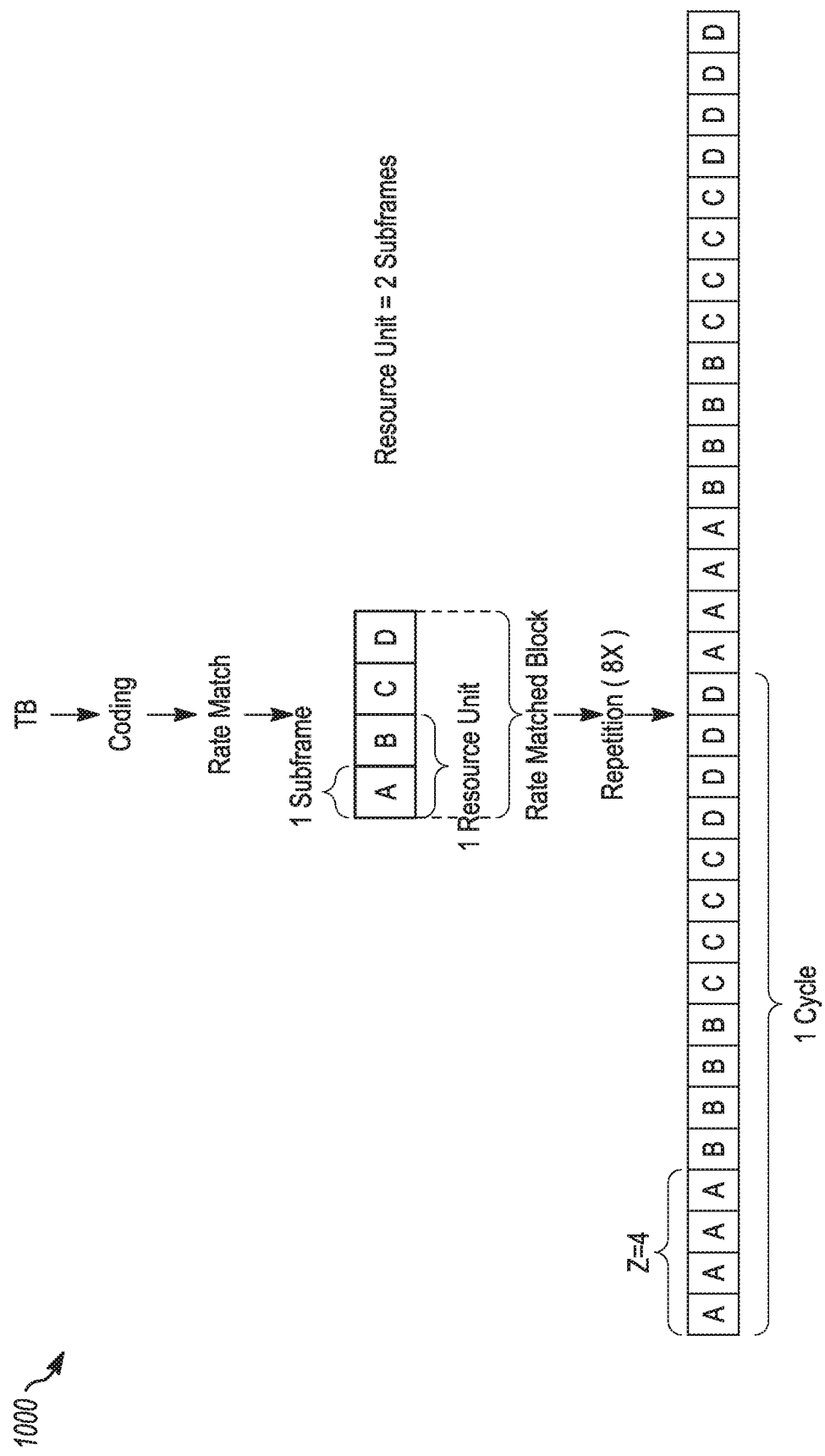
FIG. 10 illustrates an example repetition pattern in accordance with some embodiments.
Figure 11:
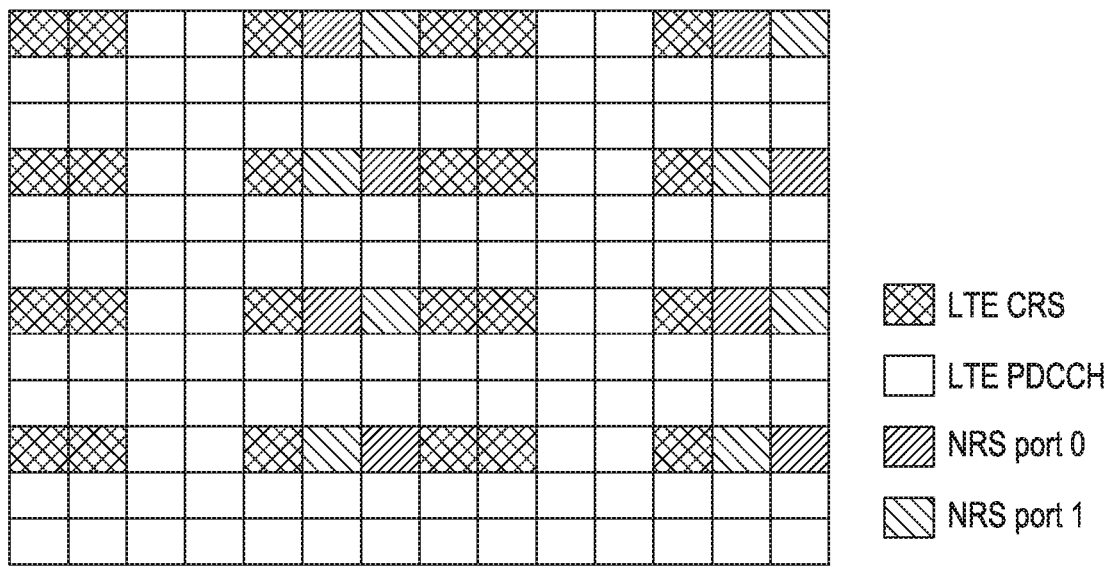
FIG. 11 illustrates an example resource allocation in accordance with some embodiments.
Figure 12:
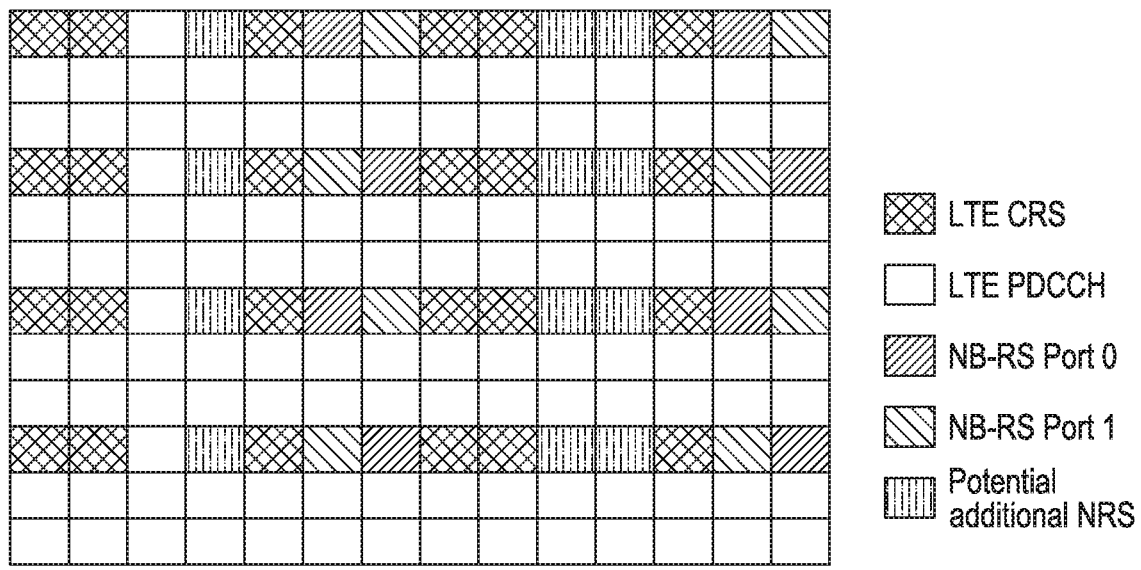
FIG. 12 illustrates another example resource allocation in accordance with some embodiments.
Figure 13:
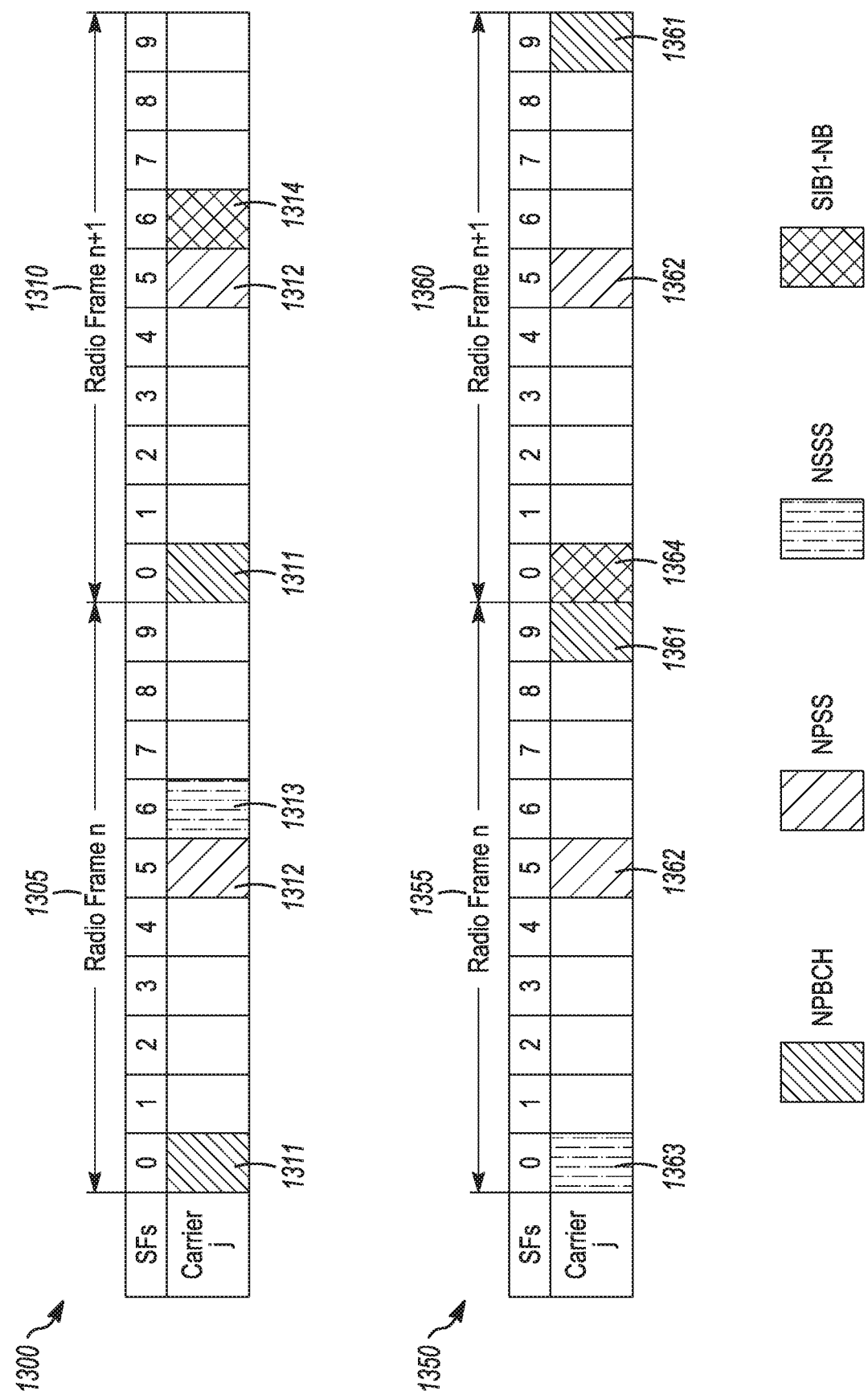
FIG. 13 illustrates an example configuration and example elements that may be transmitted in accordance with some embodiments.
Figure 14B:
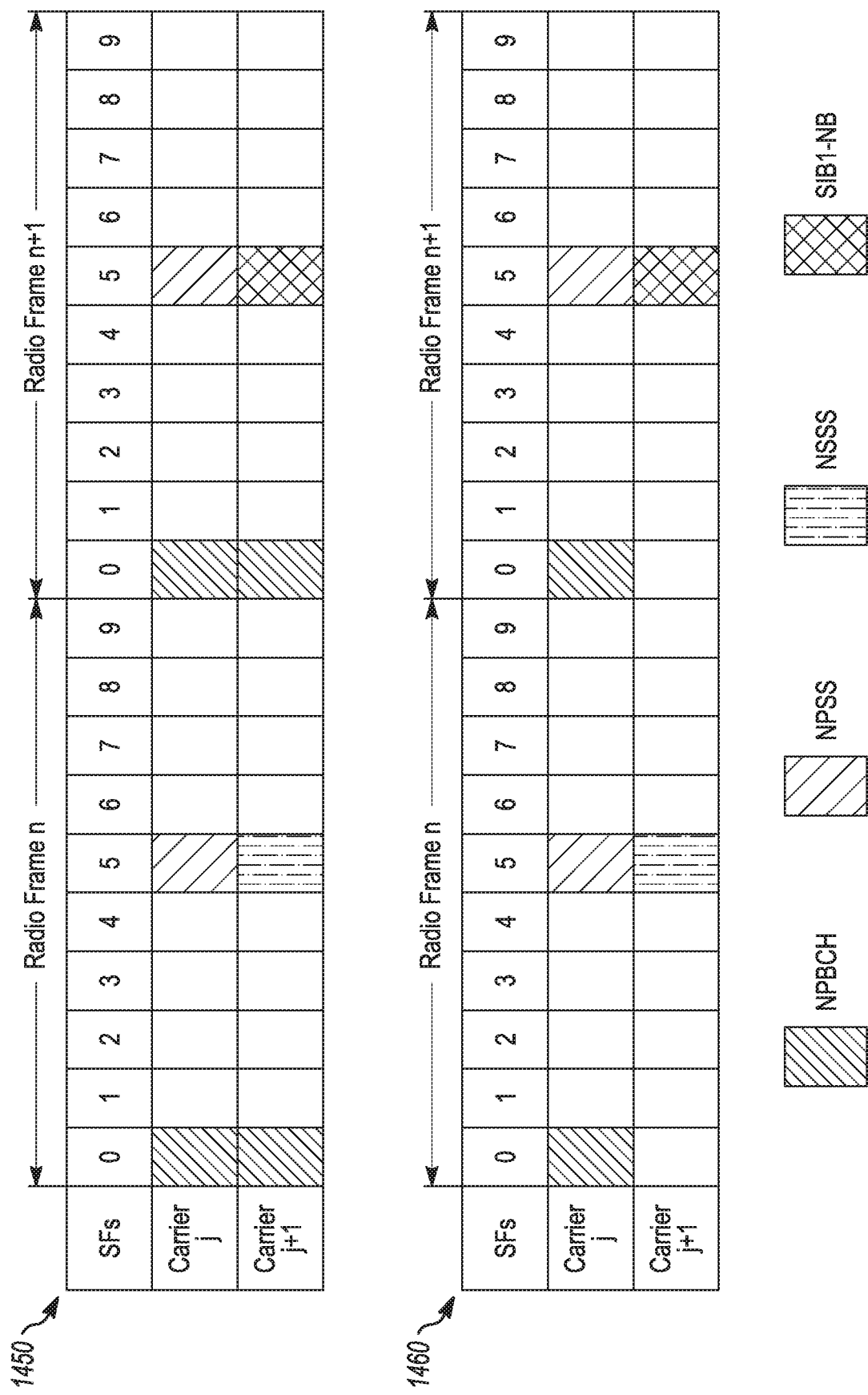
Figure 15A:
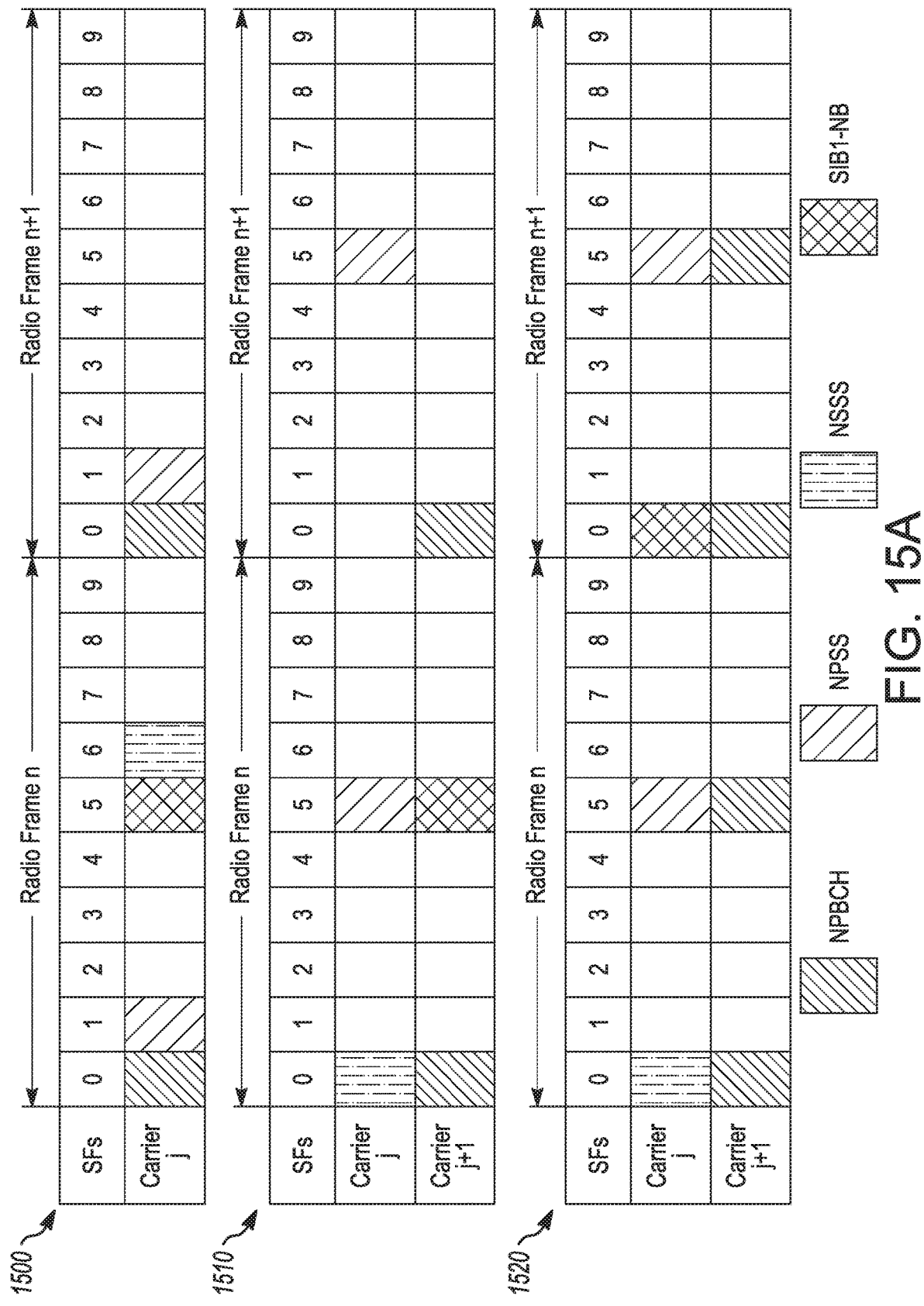
FIG. 15A and FIG. 15B illustrate additional example configurations and additional example elements that may be transmitted in accordance with some embodiments.
Figure 15B:
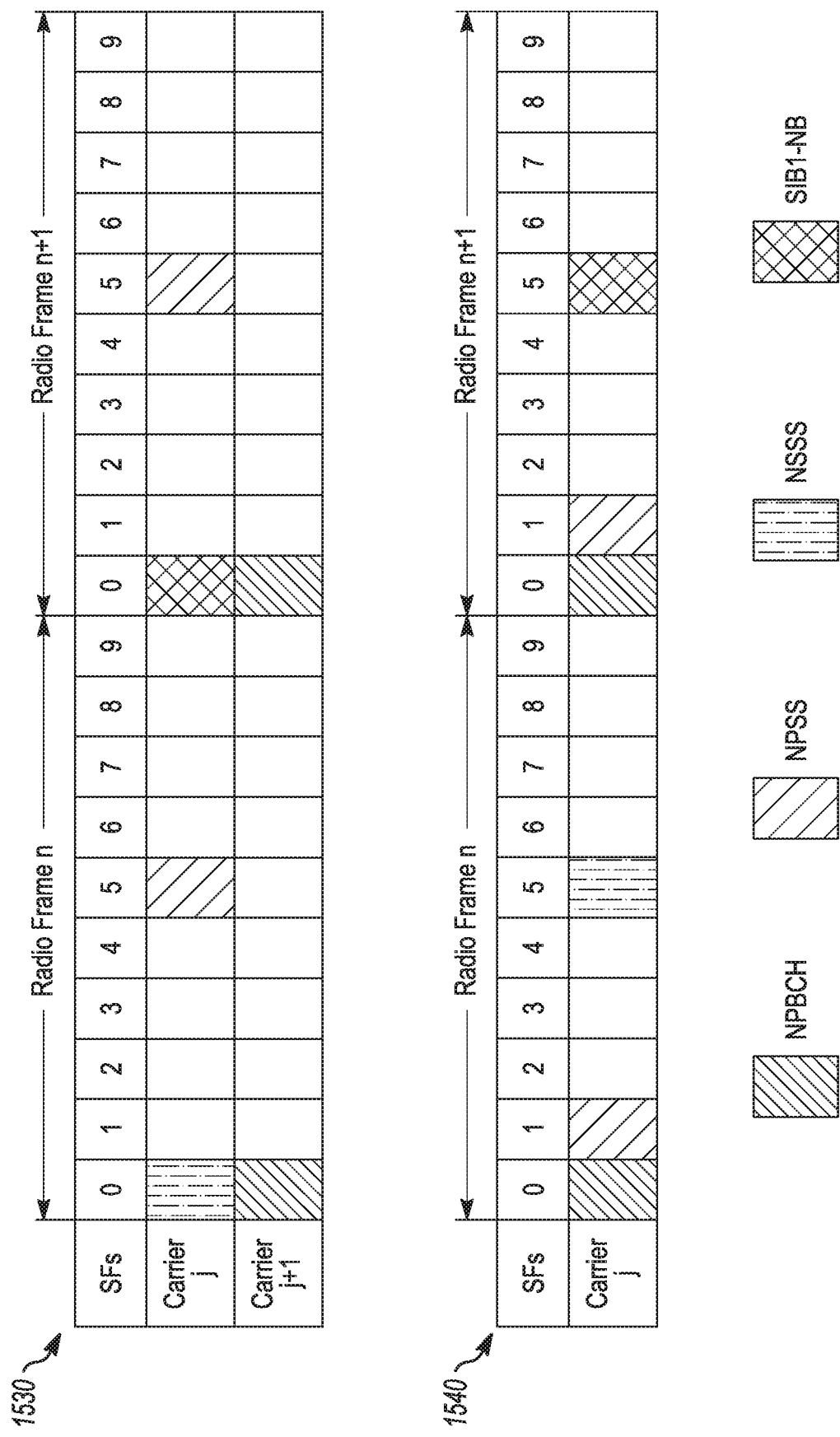

FIG. 10 illustrates an example repetition pattern in accordance with some embodiments. FIG. 11 illustrates an example resource allocution in accordance with some embodiments. FIG. 12 illustrates another example resource allocation in accordance with some embodiments. FIG. 13 illustrates an example configuration and example elements that may be transmitted in accordance with some embodiments. FIG. 14A and FIG. 14B illustrate additional example configurations and additional example elements that may be transmitted in accordance with some embodiments. In references herein, "FIG. 14" may include FIG. 14A and FIG. 14B FIG. 15A and FIG. 15B illustrate additional example configurations and additional example elements that may be transmitted in accordance with some embodiments. In references herein. "FIG. 15" may include FIG. 15A and FIG. 15B. It should be noted that the examples shown in FIGS. 10-15 may illustrate some or all of the concepts and techniques described herein in some cases, hut embodiments are not limited by the examples. For instance, embodiments are not limited by the name, number, type, size, ordering, arrangement and/or other aspects of the frames, subframes, signals, time resources, frequency resources and other elements as shown in FIGS. 10-15. Although some of the elements shown in the examples of FIGS. 10-15 may be included in a 3GPP LTE standard, 5G standard, NR standard, feNB-IoT standard and/or other standard, embodiments are not limited to usage of such elements that are included in standards.

In some embodiments, TDD/FDD differentiation may be based on different relative locations between NPSS and NSSS. Alternatively, different sequences or scrambling for NPSS and/or NSSS may be used for FDD and TDD systems. Also, indication information in MIB/SIB may be used for TDD/FDD indication.

In some embodiments, a TDD/FDD indication via NPSS and/or NSSS locations may be used. It should be noted that MBSFN may lie configured to subframes #1, 2, 3, 6, 7 and 8 in FDD systems and subframes #3, 4, 7, 8 and 9 in TDD systems. To avoid the collision between NPSS/NSSS and MBSFN, subframes #0, 1, 2, 5 or 6 may be used for NPSS/NSSS transmission in TDD systems. In embodiments in which subframe #0 is used for NPBCH transmission, NPSS/NSSS may be transmitted in subframes #1, 2, 5 or 6.

In some embodiments, NPSS may be transmitted in subframe #5 in every radio frame same as in FDD NB-IoT systems, while NSSS may be transmitted in subframes #N in every alternative radio frame, wherein N may be 1, 2 or 6. The value of N may depend on the supported TDD configurations for feNB-IoT. In a non-limiting example, if the existing TDD configurations 3, 4 and 5 are supported, N may be 6.

In some embodiments, the NPSS may be transmitted in subframe #M in every radio frame, where M may be 1, 2, or 6, while NSSS may be transmitted in subframe #N in every alternative radio frame, where N may be 1, 2, 5 or 6 other than M nor M+4. In examples where NSSS and SIB1-NB may be transmitted in the same radio frame, the N may be 1, 2, 5 or bother than M, M+4, nor the DL subframes that are used for SIB1-NB transmission. In a non-limiting example, M may be 1 and N: may be 6. This may be used in cases in which the supported TDD configurations are the existing TDD configurations 3, 4 and 5. In some embodiments, the NPSS may be transmitted in DwPTS.

In some embodiments, the TDD/FDD indication via NPSS and/or NSSS sequences may be used. To differentiate TDD from FDD, different NPSS/NSSS sequences, or different covering code (scrambling sequence) may be used. In some embodiments, different sequence(s) may be used for NPSS/NSSS.

In some embodiments, an NPSS sequence may be used. For example, ZC sequence with length 11 and root index 6 may be used. This may be a complex conjugate sequence of Rel-13 NPSS, although the scope of embodiments is not limited in this respect. Usage of this sequence may help avoid incurring additional detection complexity, in some cases.

In some embodiments, an NSSS sequence may be used. For example, a pseudo random sequence instead of length-131 ZC sequence may be used. Alternatively, a set of length-11 short ZC sequences may be mapped to each NSSS symbol.

In some embodiments, different covering code(s) and/or scrambling sequence(s) may be used for NPSS/NSSS. In some embodiments, different covering code may be used for NPSS. The covering code may be any length-11 binary sequence different from [1 1 1 1 −1 −1 1 1 1 −1 1]. In some cases, a sequence with good auto-correlation properties may be used.

In some embodiments, a set of different scrambling sequence may be used for NSSS. For example, the sequence may be length-128 Hadamard sequences but with different indexes. In Rel-13 NB IoT, the index of scrambling sequence may be determined by q=floor(PCI/126), a similar equation and/or other equation. In some embodiments, for Rel-15 feNB-IoT TDD cells, the index of the scrambling sequence may be determined by q=floor(PCI/126)+a, a similar equation and/or other equation. In the above, the parameter a may be an integer within [4, 122].

It should be noted that a combination of two or more of the above techniques/options may be used, in some embodiments. In a non-limiting example, NPSS with different sequence and NSSS with different scrambling sequences may be used. In another non-limiting example, different NPSS/NSSS sequences in addition to different transmission locations may be used.

In some embodiments, a TDD/FDD indication via information bit(s) in MIB/SIB may be used. In some embodiments, the TDD or FDD indication may be included in MIB-NB, using the reserved bits. In a non-limiting example, one bit may be used to indicate if the system is TDD or FDD. Embodiments are not limited to usage of one bit, however, as multiple bits may be used to indicate if the system is TDD or FDD, in some embodiments.

In some embodiments, N reserved bits may be used for TDD configuration indication, for out of (2^N−1) possible configurations plus FDD system indication. For example, N may be 1, 2, or 3, depending how many TDD configurations are supported for feNB-IoT. In another example, MIB-NB may configure another non-anchor carrier for SIB1-NB transmission. The indication of such carrier for SIB1-NB transmission may use the reserved bits in MIB-NB. The presence of the indication implies that the system is TDD, while the absence of the indication implies that the system is FDD.

In some embodiments, the TDD or FDD indication may be included in SIB1-NB, or other SIBs (including but not limited to SIB2-NB). The indication information may be similar as above. In a non-limiting example, one bit may be used to indicate if the system is TDD or FDD. Embodiments are not limited to usage of one bit, however, as multiple bits may be used to indicate if the system is TDD or FDD, in some embodiments. In another non-limiting example, N bits may be used to indicate a TDD configuration, for out of (2^N−1) possible configurations plus FDD system indication. The parameter N may be 1, 2, or 3, depending on how many TDD configurations are supported for feNB-IoT. Alternatively, the absence of TDD configuration indication may imply that the system is FDD.

In some embodiments, an indication of whether a configuration is TDD or FDD may be used for feNB-IoT. In some embodiments, the TDD/FDD indication may be based the relative locations between NPSS and NSSS. In some embodiments, the TDD/FDD indication may be based on the detection of different NPSS and/or NSSS sequences. In some embodiments, an NPSS sequence may be used, including but not limited to a ZC sequence with length 11 and root index 6. In some embodiments, an NSSS sequence may be used. In some embodiments, a covering code (or scrambling sequence) may be used for NPSS and/or NSSS. The covering code (or scrambling sequence) may have good auto- and cross-correlation properties, in some cases. In some embodiments, the TDD/FDD indication may be based on the indication in MIB-NB or SIB-NB.

In some embodiments, DL physical channels (such as NPDCCH, NPDSCH and/or other) and DL reference signals (such as NRS and/or other) may be used for TDD feNB-IoT cells.

In some embodiments, in Rel-13 NB-IoT, NPDCCH is based on EPDCCH design, which occupies the whole subframe, except the legacy control region for in-band operation. Within a PRB pair, 2 Narrowband Control Channel Elements (NCCEs) are defined, with one NCCE consisting of 6 subcarriers. A NPDCCH search space (SS) occurs periodically, with the starting subframe defined by the following.

$$(10n_f + \lfloor n_s/2 \rfloor) \bmod T = \lfloor \alpha_{offset} T \rfloor$$

In the above, $n_f$ is the radio frame number, $n_s$ is the slot number, $T = R_{max} * G$, and $\alpha_{offset} = \{0, 1/8, 1/4, 3/8\}$.

For NPDSCH, it may be dynamically scheduled by NPDCCH. The modulation order is QPSK and the channel coding is TBCC. Rel-13 NB-IoT supports only 1 HARD DL process, while Rel-14 eNB-IoT supports up to 2 DL HARQ processes (for Cat NB2 UEs with the capability of 2 HARQ processes). There is no RV supported for NPDSCH. The repetition pattern of NPDSCH is realized by using cyclic repetition, where in each cycle, each DL subframe in the allocated resources is repeated consecutively for Z times, with Z=min{4, indicated number of repetitions}. An example 1000 in FIG. 10 illustrates an example repetition pattern for NPDSCH.

For NRS, it is used for the demodulation of DL physical channels (NPBCH, NPDCCH and NPDSCH). To enable frequency and time tracking, some extent of cross-subframe channel estimation, and improve the accuracy of RRM measurement, a minimum set of subframes where NRS is transmitted are defined. The minimum set of subframes where NRS is transmitted is {0, 1, 3, 4, 9} which docs not contain NSSS for guard band/standalone modes, and {0, 4, 9} which docs not contain NSSS for in-band mode. Besides, UE also assumes that NRS is present in valid DL subframes which is indicated in SIB1-NB. In the example 1100 in FIG. 11, an example RE mapping of NRS in a subframe is shown.

In some embodiments, one or more of the NPDCCH format, aggregation level, coding scheme and/or other aspect may be at least partly-based on the Rel-13 NB-IoT design. Recall that in Rel-13 NB-IoT, the starting subframe of the search space is the absolute subframe. In some embodiments, considering that more subframes may become invalid DL subframes in TDD systems, new values of G may be introduced. For example, larger values such as 128, 256 may be introduced for G. In a non limiting example, possible values for G may be {2, 4, 8, 16, 32, 48, 64, 128}. In another non-limiting example, a subset of {1.5, 2, 4, 8, 16, 32, 48, 64, 128, 256} may be used. Embodiments are not limited to the example values given above. In some embodiments, one or more of the values given above may be used. In some embodiments, one or more additional values may be used.

In some cases, performance may be degraded due to the non-continuous valid DL subframes in TDD systems due to reduced opportunities for performing cross-subframe channel estimation.

In some embodiments, a number of repetitions supported may be the same as in Rel-13. For instance, $R_{max}$ may be one of {1, 2, 4, 8, 16, 32, 64, 128, 256, 512, 1024, 2048}. In some embodiments, the target MCL may be reduced if no other enhancements are introduced. Embodiments are not limited to the example values given above. In some embodiments, one or more of the values given above may be used. In some embodiments, one or more additional values may be used.

In some embodiments, a largest number of repetitions may be increased. For example, 3072 and/or 4096 may be used. In some embodiments, an amount of possible repetition numbers may be the same as or similar to numbers used in Rel-13 but with different values. In a non-limiting example, a set of supported number of repetitions may be a subset of {1, 2, 4, 8, 16, 32, 64, 128, 256, 512, 1024, 2048, 3072, 4090} with two elements excluded, where the two elements may be any numbers in the set (including but not limited to 1 and 4096). In another non-limiting example, one or more values may be added to an existing set. For instance, the set may be {1, 2, 4, 8, 16, 32, 64, 128, 256, 512, 1024, 2048, 3072}.

In some embodiments, for transmission of NPDCCH, the UL subframes may be treated as invalid DL subframes. NPDCCH transmission may occur on valid DL subframes.

In some embodiments, the UE 102 may support more UL and/or DL HARQ processes than in Rel-13 NB-IoT or in Rel-14 feNB-IoT. In a non-limiting example, the maximum number of HARQ processes may depend on not only the UE capability but also the TDD configurations. For instance, min{number of HARQ processes depending on UE capability, max number of HARQ processes in the considered TDD configuration} may be used. In some embodiments, 4, 6, 8 or 10 HARQ processes may be used. Embodiments are not limited to the example values given above. In some embodiments, one or more of the values given above may be used. In some embodiments, one or more additional values may be used.

In some embodiments, the maximum number of HARQ processes in the considered TDD configuration may be the same as (and/or similar to) one or more values used in legacy LTE TDD systems as given by the table below.

| TDD UL/DL configuration | Maximum number of DL HARQ processes | Maximum number of UL HARQ processes |
| --- | --- | --- |
| 0 | 4 | 7 |
| 1 | 7 | 4 |
| 2 | 10 | 2 |
| 3 | 9 | 3 |
| 4 | 12 | 2 |
| 5 | 15 | 1 |
| 6 | 6 | 6 |

In some embodiments, the maximum number of HARQ processes in the considered TDD configuration may be the same as (and/or similar to) one or more values used in eMTC TDD systems, as given by the table below.

| TDD UL/DL configuration | Maximum number of HARQ processes |
| --- | --- |
| 0 | 6 |
| 1 | 9 |
| 2 | 12 |
| 3 | 11 |
| 4 | 14 |
| 5 | 16 |
| 6 | 8 |

In some embodiments, a number of HARQ processes may be smaller than what is supported in legacy LTE or eMTC TDD systems. For example, the max number of HARQ processes for DL/UL may be min{the max number of DL/UL processes in LTE or eMTC, N}, wherein N may be a positive integer, such as 4, 6, 8, 10, 12 or 14. Alternatively, the max number of HARQ processes for DL/UL may be {the max number of DL/UL processes in LTE or eMTC-M}, wherein M may be a positive integer such as 1, 2 or 3.

In some embodiments, additional bit(s) may be introduced to the field indicating the HARQ process ID in DCI format N1 or N0, for example, 3 bits for up to 8 HARQ processes and 4 bits for up to 16 HARQ processes. In some embodiments, a soft buffer size for UEs 102 supporting a larger number of HARQ processes may be the same as (and/or similar to) value(s) used in Rel-14 eNB-IoT UEs 102. In a non-limiting example, a total number of soft channel bits may be 6400 bits for 1, 2 and more HARQ processes.

In some embodiments, an NPDSCH may be used for TDD feNB-IoT cells. In souk embodiments, a repetition pattern may be different from Rel-13 NB-IoT NPDSCH. For example, parameter Z may be determined by min{X, indicated number of repetitions} in TDD feNB-IoT cells, wherein X may be any integer. In a non-limiting example, X may be equal to 10. This value may be similar to a value used for eMTC design in CE mode B, although the scope of embodiments is not limited in this respect.

In some embodiments, performance of NPDSCH may be degraded due to the non-continuous valid DL subframes in TDD systems. In a non-limiting example, a supported number of repetitions may be one of {1, 2, 4, 8, 16, 32, 64, 128, 192, 256, 384, 512, 768, 1024, 1536, 2048}. In some embodiments, a target MCL may be reduced.

In some embodiments, a largest number of repetitions may be increased. For example, 3072 and/or 4096 may be used. In a non-limiting example, the amount of supported number of repetitions may be the same as (and/or similar to) value(s) used in Rel-13 but with different values. For instance, a subset of {1, 2, 4, 8, 16, 32, 64, 128, 192, 256, 384, 512, 768, 1024, 1536, 2048, 3072, 4096} with two elements excluded may be used. As a non-limiting example, the two elements may be any numbers in the set (such as 1 and 4096; 192 and 4096; and/or other). In another non-limiting example, the value may be one of {1, 2, 4, 8, 16, 32, 64, 128, 192, 256, 384, 512, 768, 1024, 1536, 2048, 3072}.

In some embodiments, one or more techniques may be used to compensate the impact of non-continuous DL subframes in TDD systems.

In some embodiments, no additional number of repetitions are introduced in comparison to a legacy design. The supported maximum DL TBS may be reduced. A new TBS table may be introduced, with at least some entries having smaller TBS than the existing TBS table for Rel-13 NB-IoT. For example, the TBS values for certain resource allocation are reduced to the integer closest to X multiplied by the TBS value in Rel-13 NB-IoT or Rel-14 eNB-IoT, where X may be any value within (0, 1). For instance, values such as 0.5, 1/3 and/or other may be used.

In some embodiments, a TBS table may be the same as (and/or similar to) a table used in a legacy protocol. In a non-limiting example, a scaling factor S may be predefined or indicated by the eNB 104/gNB 105 via RRC signaling or DCI. The TBS would equal to floor(X/S), round(X/S) or ceil (X/S), wherein X is the indicated TBS by looking up the existing Rel-13 or Rel-14 (e)NB-IoT TBS table.

In some embodiments, a maximum DL TBS may be the same as (and/or similar to) value(s) used in Rel-13 NB-IoT (1000 bits) or Rel-14 (2536 bits), depending on UE capability. In some embodiments, a maximum DL TBS of 2536 bits may be supported in TDD feNB-IoT. As another option, the maximum DL TBS may be further increased. In some cases, techniques described herein may be used to improve the DL data rate, at the cost of MCL.

In some embodiments, for transmission of NPDSCH, the configured UL subframes may be treated as invalid DL subframes. The NPDSCH transmission may occur on valid DL subframes. In some embodiments, the scheduling delay indicated by NPDCCH may count only the valid DL subframes (for instance, excluding the configured UL subframes and other invalid DL subframes).

In some embodiments, a timing relationship of each HARQ process may be the same as (and/or similar to) a timing relationship of a legacy protocol (such as Rel-13 NB-IoT and/or other). In some embodiments, for UEs 102 supporting single HARQ process, one or more of the following may be applicable: the start of UL A/N transmission is >=12 ms later than the end of the corresponding NPDSCH transmission; the start of DL A/N transmission is >=3 ms later than the end of the corresponding NPUSCH transmission: the start of NPUSCH transmission is >=8 ms later titan the end of its associated NPDCCH transmission; the start of an NPDCCH search space is >=4 ms after the end of the last NPDCCH search space; the start of NPDSCH transmission is >=4 ms later than the end of its associated DL assignment; the start of a DL transmission is >=3 ms later than the end of any NPUSCH transmission for the same UE 102; and/or other. In some embodiments, for UEs 102 supporting more than one HARQ processes, one or more of the following may be applicable: a gap between NPUSCH to any DL reception is ≥1 ms, a Rel-13 timing relationship for each HARQ process may be used; and/or other.

In some embodiments, narrowband reference signals (NRSs) may be used for TDD feNB-IoT cells. In some embodiments, a minimum set of subframes in which NRSs are transmitted may be different from Rel-13/Rel-14 (e)NB-IoT. In some embodiments, in guard band/standalone modes, depending on the supported TDD UL-DL configurations, the minimum set of subframes in which NRS is transmitted may be {0, 6, 7, 8, 9} which does not contain NSSS (for example, in embodiments in which the supported TDD UL-DL configurations are existing TDD configurations 3-5 in LTE). In some embodiments, if the feNB-IoT TDD cell introduces new TDD configuration(s) (for instance, TDD UL-DL configuration(s) with subframes 0-4 being configured as DL subframes), then the minimum set of subframes that NRS is transmitted may be {0, 1, 2, 3, 4} which does not contain NSSS.

In some embodiments, for in-band modes, depending on the supported TDD UL-DL configurations, the minimum set of subframes where NRS is transmitted may be {0, 6} which does not contain NSSS (for example, in embodiments in which the supported TDD UL-DL configurations are existing TDD configurations 3-5 in LTE). As another example, if the feNB-IoT TDD cells introduces new TDD configuration(s) (such as TDD UL-DL configuration(s) with subframes 0-4 being configured as DL subframes), then the minimum set of subframes that NRS is transmitted may be {0, 1, 2} which does not contain NSSS.

In some embodiments, the minimum set of subframes in which NRS is transmitted may include the special subframe. For instance, with existing TDD UL-DL configurations 3-5, the subframe #1 may also be defined as one subframe in the minimum set of subframes carrying NRS. A minimum set of symbols within the special subframe may be predefined to cam NRS, e.g. symbols 3-2, or symbols 3-8, or symbols 3-9, or symbols 3-10, or symbols 3-11. The minimum set of subframes wherein NRS is transmitted may be {0, 1, 6, 7, 8, 9} for guard band/standalone modes, and {0, 1, 6} for in-band mode.

In some cases, performance may be degraded due to the non-continuous valid DL subframes in TDD systems. To improve the performance, NRS density may be increased. In some embodiments, the increased NRS density may be applicable to all NPDCCH/NPDSCH transmissions. In some embodiments, the increased NRS density may be applicable to some or all NPDCCH/NPDSCH transmissions. In some embodiments, the increased NRS density may be applicable to one or more NPDCCH/NPDSCH transmissions. In some embodiments, the increased NRS density may be applicable to NPDCCH/NPDSCH transmissions with number of repetitions larger than certain value, denoted by Y. The parameter Y may be any integer. Non-limiting example values of Y include 32, 256, 512, and 1024.

In some embodiments, usage of increased NRS density may be Configurable. In some embodiments, the usage of increased NRS density may be indicated via the DCI scheduling the NPDSCH. Other elements may be used to indicate the increased NRS density, in some embodiments. In some embodiments, the usage of increased NRS density may be configured via higher layer signaling. In some embodiments, the usage of increased NRS density may be configured via higher layer signaling when the number of NPDSCH repetitions is larger than a specified value.

In a non-limiting example, the increased NRS may be transmitted in symbols #3, 9, and/or 10, as illustrated in FIG. 12. In some embodiments, the NRS may be transmitted in the same symbols as in Rel-13 for instance, symbols #5, 6, 12 and 13), but at different subcarriers. For instance, the subcarriers next to the ones used for NRS transmission in Rel-13 NB-IoT may be used. Embodiments are not limited to those subcarriers, as other arrangements are possible.

In some embodiments, the NRS may be transmitted in symbols and subcarriers that are different from Rel-13 design. For instance, the NRS may be transmitted in symbols #3, 9, and/or 10 and in the subcarriers next to the subcarriers used for NRS transmission in Rel-13 NB-IoT.

In some embodiments, NPDCCH and/or NPDSCH may be used for TDD feNB-IoT. In some embodiments, a parameter G to define the NPDCCH search space may be increased. In some embodiments, a supported repetition number of NPDCCH and/or NPDSCH may be increased. In some embodiments, more HARQ processes may be supported for DL and/or UL transmission in TDD feNB-IoT, and additional bits are added to the HARQ process ID Held in DCI. In some embodiments, the TBS for NPDSCH may be the same as pre-release (e)NB-IoT: may be increased; may be reduced; or may be mapped to more resources. In some embodiments, a timing relationship for each HARQ process may follow Rel-13 NB-IoT timing relationship. In some embodiments, an NRS density may be increased. In some embodiments, an NRS location may be moved to symbols before 10 for DL transmission in DwPTS. In some embodiments, a soft buffer size for Rel-15 feNB-IoT TDD UEs 102 may be the same as for Rel-14 eNB-IoT UEs 102, regardless of how many HARQ processes are supported.

In some embodiments, NPSS and NSSS may be used for TDD feNB-IoT cells. In some embodiments, the NPSS and NSSS sequences and/or transmission locations may be the same as (and/or similar to; elements used in the Rel-13 NB-IoT design.

In some embodiments, the NPSS sequence and/or its covering code can be different from Rel-13 NB-IoT. By detecting the different NPSS, the UE 102 may determine is the system is a TDD system.

In a non-limiting example, the NSSS can be transmitted in a same NB-IoT carrier in which an NPSS is transmitted. For example, the NPSS can be transmitted in subframe 5 while NSSS can be transmitted in subframe 6, as illustrated in FIG. 13. In a non-limiting example shown in FIG. 13, in 1300, the NPBCH 1311, NPSS 1312, NSSS 1313 and SIB1-NB 1314 are transmitted on the same carrier. The NSSS 1313 and the SIB1-NB 1314 are transmitted in different radio frames (NSSS 1313 is transmitted in 1305, SIB1-NB 1314 is transmitted in 1310).

In another non-limiting example shown in FIG. 13, in 1350, the NPBCH 1361, NPSS 1362, NSSS 1363 and SIB1-NB 1364 are transmitted on the same carrier. The NPSS can be transmitted in subframe 5 while NSSS can be transmitted in subframe 0. The NSSS 1363 and the SIB1-NR 1364 are transmitted in different radio frames (NSSS 1363 is transmitted in 1355, SIB1-NB 1364 is transmitted in 1360).

Alternatively, the NPSS can be transmitted on subframe 6 and the NSSS/SIB1-NB can be transmitted on subframe 5. As another example, the NPSS and the NSSS can be transmitted on subframe 0 and 5. For example, the NPSS may be transmitted on subframe 0 and the NSSS may be transmitted on subframe 5; or the NPSS may be transmitted on subframe 5 and the NSSS may be transmitted on subframe 0. In some embodiments, subframes that can be configured as MBSFN can be used for NB-IoT (for instance, by puncturing the LTE MBSFN transmission on the NB-IoT carriers), and the NPSS and NSSS can be transmitted on subframe 0, 5 or 9. For example, the NPSS can be transmitted on 5 while NSSS can be transmitted on subframe 0 or 9. More examples with NPSS and NSSS transmitted on the same carrier are illustrated in FIG (the one with d and e).

In another non-limiting example, the NSSS can be transmitted in a different carrier different from carrier(s) in which the NPSS is transmitted. The carrier with NSSS transmission can be predefined, with a fixed offset from live carrier where NPSS is transmitted. For example, the next or prior carrier with respect to the carrier with NPSS may be used. For example, for in band and guard band operation mode, the carrier with NPSS can be the candidate anchor carrier defined in Rel-13 NB-IoT (such as in the table below). The index of the carrier for NSSS can be equal to a sum of the index of carrier with NPSS and a number K. In some embodiments, K may be predefined (such as K=1 and/or other value). In this example, the carrier with NSSS may not be subject to a channel raster constraint.

| LTE system bandwidth | 3 MHz | 5 MHz | 10 MHz | 15 MHz | 20 MHz |
|---|---|---|---|---|---|
| PRB indices for NB-PSS/SSS transmission | 2, 12 | 2, 7, 17, 22 | 4, 9, 14, 19, 30, 35, 40, 45 | 2, 7, 12, 17, 22, 27, 32, 42, 47, 52, 57, 62, 67, 72 | 4, 9, 14, 19, 24, 29, 34, 39, 44, 55, 60, 65, 70, 75, 80, 85, 90, 95 |

As another example, the carrier with NPSS and the other carrier with NSSS can be both on the candidate anchor carriers defined in Rel-13 NB-IoT (such as two carriers selected from the table above). In this example, the NPSS can be transmitted on PRB index N, while the NSSS can be transmitted on N+K, wherein K is predefined. In cases in which K=10, the carrier with NPSS can be one of the PRB given by the table below.

| LTE system bandwidth | 3 MHz | 5 MHz | 10 MHz | 15 MHz | 20 MHz |
|---|---|---|---|---|---|
| PRB indices for NB-PSS transmission in TDD feNB-IoT | 2 | 2, 7 | 4, 9, 30, 35 | 2, 7, 12, 17, 22, 32, 42, 47, 52, 57, 62 | 4, 9, 14, 19, 24, 29, 34, 55, 60, 65, 70, 75, 80, 85 |

In cases in which K=−10, the carrier with NPSS can be one of the PRB given by the table below.

| LTE system bandwidth | 3 MHz | 5 MHz | 10 MHz | 15 MHz | 20 MHz |
|---|---|---|---|---|---|
| PRB indices for NB-PSS transmission in TDD feNB-IoT | 12 | 17, 22 | 14, 19, 40, 45 | 12, 17, 22, 27, 32, 42, 52, 57, 62, 67, 72 | 14, 19, 24, 29, 34, 39, 44, 65, 70, 75, 80, 85, 90, 95 |

In some embodiments, the NSSS can be transmitted in subframe 0 or 5 on a carrier different from what is used for NPSS transmission. In a non-limiting example, the NPBCH can be transmitted on subframe 0 on the carrier with NPSS, while NSSS/SIB1-NB can be transmitted on subframe 0 on a different carrier. Referring to FIG. 14, examples 1400 and 1410 illustrate this concept. The NSSS and SIB1-NB are transmitted on different carriers. The NSSS and SIB1-NB are transmitted in different subframes. The NPBCH can be transmitted on both carriers or only on one of these carriers (as shown in this examples).

In another non-limiting example, the NPBCH can be transmitted in subframe 0 on the carrier with NSSS, while NSSS can be transmitted in subframe 5. Referring to FIG. 14, examples 1450 and 1460 illustrate this concept. The NPSS and NSSS/SIB1-NB are transmitted on different carriers. The NSSS and SIB1-NB are transmitted in the same subframe but in different radio frames. The NPBCH can be transmitted in both carriers (as shown in 1450) or only on one of these carriers (as shown in 1460). Note that another alternative of lower example is transmission of NSSS and SIB1-NB in SF 0 in alternate radio frames, while the SF 5 is available for other DL transmissions (which may be based on gNB 105/eNB 104 scheduling, in some cases).

In some embodiments (including but not limited to one or more of the examples given above), the TDD feNB-IoT cell may need to support at least two NB-IoT carriers.

In the example 1500 in FIG. 15, the NPBCH, NPSS, NSSS and SIB1-NB are transmitted on the same carrier, where NSSS and SIB1-NB are transmitted in different subframes. In the examples 1510, 1520, 1530 in FIG. 15, the PSS and NSSS are transmitted on the same carrier, while the MIB-NB/SIB1-NB can be transmitted on different carriers. In the example in 1540 in FIG. 15, the NPBCH, NPSS, NSSS and SIB1-NB are transmitted on the same carrier, and the NSSS and SIB1-NB are transmitted in the same subframe but in different radio frame. In some embodiments, NPSS can be transmitted in a special subframe, although the scope of embodiments is not limited in this respect.

In some embodiments, a SIB-NB may be used for TDD feNB-IoT cells. In some embodiments, TDD/FDD differentiation and/or TDD UL-DL configuration may be indicated by the system information block (such as SIB1-NB and/or other). The system information of the SIB1-NB and/or other block may include an indication for TDD/FDD differentiation and/or TDD UL-DL configuration. In a non limiting example, the TDD/FDD differentiation can be explicitly indicated via 1 bit. In another non-limiting example, the TDD/FDD differentiation can be explicitly indicated via any number of bits. In another non-limiting example, the TDD/FDD differentiation can be implicitly indicated. The absence of TDD UL-DL configuration indication may imply that the system is FDD.

In some embodiments in which TDD UL DL configuration is indicated by SIB1-NB, one example is to reuse the downlinkBitmap field in SIB1-NB for the indication of valid DL subframes taking into account the TDD UL-DL configuration. The UE 102 may assume the remaining subframes as valid UL subframes, or another field can be introduced to indicate the valid UL subframes.

In some embodiments, the index of TDD UL-DL configuration can be indicated in SIB1-NB. Then the valid DL subframes for feNB-IoT are the subframes that are DL according to the TDD UL-DL configuration and are also indicated by the downlinkBitmap as the valid DL subframes.

In some embodiments, scheduling information for other system information carried in SIB1-NB can include the carrier indication where the other system information to be sent. This can be used in embodiments in which the SIB1-NB and other system information can be transmitted on different NB-IoT carriers.

In some embodiments, in Rel-13/Rel-14 (e)NB-IoT, SIB1-NB is transmitted in subframe #4. Recall that in TDD systems, the subframes #3, 4, 7, 8 and 9 may be configured as MBSFN subframes. Thus, the SIB1-NB transmission subframe may need to be updated to another subframe which cannot be configured for MBSFN. For example, SIB1-NB can be transmitted in subframe #1, 2, 5 or 6. The NPSS and/or NSSS can be transmitted on subframe #1, 2, 5 or 6. Taking into account the subframes used for NPSS and NSSS transmission, the following embodiments for SIB1-NB transmission can be considered.

In some embodiments, the SIB1-NB can be transmitted in the same subframe as NSSS transmission but in a different radio frame on the carrier in which NPSS is transmitted. For example, the NPSS can still be transmitted on subframe #5 (which may be the same as or similar to a technique of Rel-13 NB-IoT, although the scope of embodiments is not limited in this respect), while NSSS and SIB1-NB can be transmitted on subframe #6. The NSSS and SIB1-NB may be transmitted in alternate radio frames. For instance, the NSSS may be transmitted in an odd radio frame and the SHH-NB may be transmitted in an even radio frame; the NSSS may be transmitted in an even radio frame and the SHH-NB may be transmitted in an odd radio frame; and/or other. As another example, NSSS and SIB1-NB can be transmitted on subframe #5 in alternate radio frames, on the carrier different from the carrier with NPSS, or on the same carrier with NPSS where NPSS is transmitted in special subframe.

The following examples can be considered to determine which radio frame is used for NSSS and which is used for SIB1-NB. In a non-limiting example, the NSSS can be transmitted in an even radio frame, while the SIB1-NB is transmitted in odd radio frame, or vice versa. In another non-limiting, example, the NSSS is transmitted in an even radio frame when PCID mod 2=1 and in odd radio frame when PCID mod 2=0, while SIB1-NB is transmitted based on the table below. This scheme may limit the randomization across cells in certain cases. For instance, when the number of SIB1-NB repetitions is 16, all the cells may have SIB1-NB starting radio frame at SFN mod 256=0 (if SIB1-NB is transmitted in even radio frame) or SFN mod 256=1 (if SIB1-NB is transmitted in odd radio frame).

| $R_{NB-SIB1}$ | PCID | Starting radio frame number for NB-SIB1 repetitions |
|---|---|---|
| 4 | PCID mod 4 = 0 | SFN mod 2.56 = 0 |
|   | PCID mod 4 = 1 | SFN mod 256 = 17 |
|   | PCID mod 4 = 2 | SFN mod 256 = 32 |
|   | PCID mod 4 = 3 | SFN mod 256 = 49 |
| 8 | PCID mod 2 = 0 | SFN mod 256 = 0 |
|   | PCID mad 2 = 1 | SFN mod 256 = 17 |
| 16 | PCID mod 2 = 0 | SFN mod 256 = 0 |
|   | PCID mod 2 = 1 | SFN mod 256 = 1 |

Alternatively, the NSSS may be transmitted in odd radio frame when PCID mod 2=1 and in even radio frame when PCID mod 2=0, while SIB1-NB is transmitted based on the table below.

| $R_{NB-SIB1}$ | PCID | Starting radio frame number for NB-SIB1 repetitions |
|---|---|---|
| 4 | PCID mod 4 = 0 | SFN mod 256 = 1 |
|   | PCID mod 4 = 1 | SFN mod 256 = 16 |
|   | PCID mod 4 = 2 | SFN mod 2.56 = 33 |
|   | PCID mod 4 = 3 | SFN mod 256 = 48 |
| 8 | PCID mod 2 = 0 | SFN mod 256 = 1 |
|   | PCID mod 2 = 1 | SFN mod 256 = 16 |
| 16 | PCID mod 2 = 0 | SFN mod 256 = 1 |
|   | PCID mod 2 = 1 | SFN mod 256 = 0 |

In some embodiments, SIB1-NB scheduling can still follow Rel-13 NB-IoT design, i.e., depending on the PCID, and the radio frame carrying NSSS transmission also depends on the PCID, e.g. NSSS is transmitted in even radio frame if PCID mod 2=1 and NSSS is transmitted in odd radio frame if POD mod 2=0 if the number of SIB1-NB repetitions is 16; otherwise, the NSSS is transmitted in odd radio frames. With this example, the UE 102 may not necessarily know the exact 80 ms boundary before detection of MIB-NB, and thus hypothesis tests for whether the radio frame is the first one or second one of 80 ms boundary may be needed.

In some embodiments, the SIB1-NB can be transmitted in a subframe different from the subframes used for NPSS and NSSS transmission on the carrier with NPSS transmission. For example, NPSS can still be transmitted on subframe #5, while NSSS and SIB1-NB can be transmitted on subframe #1 and #6, respectively. Alternatively, the NPSS, NSSS and SIB1-NB can be transmitted on subframe #1, 6 and 5, respectively, as illustrated in 1500 in FIG. 15. In some embodiments, the NPSS can be transmitted on the special subframe. In some embodiments, the SIB1-NB can be transmitted on the carrier different from the carrier with NPSS transmission. The carrier with SIB1-NB transmission can be indicated by MIB-NB or be predefined. This embodiment can be applied to the TDD feNB-IoT cell supporting at least two NB-IoT carriers to transmit SIB1-NB. The subframe used for SIB1-NB can be the same as the subframe for NPSS/NSSS/NPBCH. e.g. subframe #0, 5 or 6 can be used. Examples are shown in FIGS. 13 and 14.

It should be noted that combinations of above embodiments may be used. For example, in certain TDD configurations, the SIB1-NB can be transmitted on the carrier with NPSS transmission, while in other TDD configurations (e.g. with limited number of DL subframes), the SIB1-NB can be transmitted on the carrier different from where NPSS is transmitted. In this example, the TDD configuration can be indicated by MIB-NB such that the UE 102 knows which transmission scheme is used for SIB1-NB, or alternatively the absent indication of additional carrier for SIB1-NB transmission implies that the SIB1-NB is transmitted on the anchor carrier.

In some embodiments, transmission of system information other than SIB1-NB may be performed. Other SIBs can be transmitted in the similar method as in Rel-13 NB-IoT, where the scheduling information is carried in SIB1-NB. The following embodiments can be considered for the interpretation of scheduling information. In some embodiments, the scheduled subframes are the absolute subframes. If some of the subframes scheduled for SIB transmission are not valid DL subframes for feNB-IoT, the transmission on those invalid DL subframes is punctured. In some embodiments, the scheduled subframes are the absolute subframes. If some of the subframes scheduled for SIB transmission are not valid DL subframes for feNB-IoT, the transmission on these invalid DL subframes is postponed to the following valid DL subframes. In some embodiments, the scheduled subframes are not absolute subframes, but only take into account the valid DL subframes for feNB-IoT. In some embodiments, system information other than SIB1-NB is transmitted on the carrier same as where SIB1-NB is transmitted or same as where MIB-NB or NPSS is transmitted. Alternatively, the system information other than SIB1-NB can be transmitted on the other carriers, which can be indicated by SIB1-NB.

In some embodiments, MIB-NB may be used for TDD feNB-IoT cells. In some embodiments, the transmission method of MIB-NB can follow the Rel-13 NB-IoT design, where the MIB-NB is transmitted on the carrier same as the one with NPSS transmission. In one example, MIB-NB is transmitted in subframe 0 every 10 ms on the carrier same as where NPSS is transmitted. Alternatively, MIB-NB can be transmitted on subframe 0, 5 or 9, e.g. with transmission periodicity of 10 ms. As another example, MIB-NB can be transmitted on subframe 0, 5 or 9 every 20 ms. With this example, to enhance the MIB acquisition time, MIB-NB can be additionally transmitted during DwPTS (e.g. in subframe 1). MIB-NB and NSSS or SIB1-NB can be TDMed in this example, e.g. transmitted in alternate radio frames on subframe 0, 5 or 9.

In some embodiments, the MIB-NB can be transmitted on a carrier different from the carrier with NPSS. For example, the MIB-NB can be transmitted on the same carrier as where NPSS is transmitted, and additionally transmitted in the carrier with NSSS/SIB1-NB on subframe 0 (including but not limited to scenarios such as in 1450, 1460 in FIG. 14). Alternatively, the MIB-NB can be only transmitted on the carrier with NSSS or SIB1-NB, which may be different from the carrier with NPSS transmission (including but not limited to scenarios such as in 1510, 1520, 1530 in FIG. 15). In some embodiments, the MIB-NB can be transmitted only on SF 0 of the carrier different from carrier with NPSS, while in some other embodiments, the MIB NB can be transmitted on both SF 0 and SF 5 of the carrier different from the carrier with NPSS.

In some embodiments, the carrier different from the one with NPSS transmission can be predefined, e.g. the one next to the carrier with NPSS transmission. Alternatively, it can be K PRB away from the carrier with NPSS. In examples where both NPSS carrier and the carrier with NPBCM are the candidate anchor carrier in Rel-13 NB-IoT, K can be 10 or −10, with the NPSS carrier limiting to certain PRB indices, as shown previous tables for K=10 and K=−10. By adopting different NPSS/NSSS designs from FDD NB-IoT systems, UE 102 may be able to determine whether the system is a TDD system and know which carrier to receive MIB-NB.

In some embodiments, the design of NPSS, NSSS, and/or MIB-NB are the same for different operation modes, e.g. in-band, guard-hand and/or standalone modes. Alternatively, the design of NPSS, NSSS and/or MIB-NB can be different for different operation modes, e.g. same in in-band and guard-band, but different in standalone modes.

In some embodiments, regarding the contents of MIB-NB, certain information bits and/or spate bits can be re-interpreted. In some embodiments in which the TDD/FDD differentiation and/or TDD UL-DL configuration is indicated by MIB-NB, spare hits in MIB-NB can be used for these indications. In one example, the TDD/FDD differentiation can be explicitly indicated via 1 bit. In one example, the TDD/FDD differentiation can be implicitly indicated. The absent of TDD UL-DL configuration indication implies that the system is FDD.

In some embodiments, the scheduling information of SIB1-NB can be re-interpreted. In cases in which the SIB1-NB is transmitted only in even radio frame or odd radio frame, the table below may be used, wherein x=0 for cases with SIB1-NB transmission only on even radio frame and x=1 for cases with SIB1-NB transmission only on odd radio frame.

| $R_{NB\text{-}SIB1}$ | PCID | Starting radio frame number for NB-SIB1 repetitions |
|---|---|---|
| 4 | PCID mod 4 = 0 | SFN mod 256 = 0 + x |
|   | PCID mod 4 = 1 | SFN mod 256 = 16 + x |
|   | PCID mod 4 = 2 | SFN mod 256 = 32 + x |
|   | PCID mod 4 = 3 | SFN mod 256 = 48 + x |

| $R_{NB-SIB1}$ | PCID | Starting radio frame number for NB-SIB1 repetitions |
|---|---|---|
| 8 | PCID mod 2 = 0 | SFN mod 256 = 0 + x |
|   | PCID mod 2 = 1 | SFN mod 256 = 16 + x |
| 16 | All PCID | SFN mod 256 = x |

In some embodiments, in cases in which SIB1-NB is transmitted in subframe index that is different from what is used for NPSS or NSSS, one of the tables above may be used for determining the starting radio frame of SIB1-NB repetitions. The information bits in MIB-NB for SIB1-NB scheduling information in these cases can be interpreted the same as Hel-13 NB-foT, except that the subframe #4 which is used for SIB1-NB transmission in Rel-13 NB-IoT is updated to the other subframe that is designed for SIB1-NB transmission in TDD feNB-IoT cells.

In some embodiments, in cases in which SIB1-NB can be transmitted on non-anchor carrier, the carrier used for SIB1-NB transmission can be indicated by the MIB-NB. For example, some of the spare bits in MIB-NB can be used for indication of the non-anchor carrier used for SIB1-NB transmission. The indication can be in terms of offset with respect to which the anchor carrier carrying the MIB-NB, or be in terms of the carrier within the systems.

In some embodiments, the number of repetitions, subframes for SIB1-NB transmission and TBS can be indicated similar as the indication on anchor carrier in Rel-13 NB-IoT. The subframes/radio frames used to send SIB1-NB in anchor carrier and non-anchor can be different or the same.

In some embodiments, for which subframe to send SIB1-NB on non-anchor carrier, in one example, the SIB1-NB on non-anchor carrier can be sent on SF 0 as in anchor carrier. Alternatively, the SIB1-NB can be sent on other SFs, e.g. SF 5, or 9. In some embodiments, for which radio frame to send SIB1-NB on non-anchor carrier, in one example, SIB1-NB on non-anchor carrier can be always sent on odd radio frame as in anchor carrier. Alternatively, the radio frame can depend on PCID as in Rel-13 NB-IoT.

In some embodiments, the table below may be used to configure the radio frame to send SIB1-NB on non-anchor carrier, where x can be 1 as on anchor carrier and the starting radio frame with 16 repetitions can be modified by be always on SFN mod 256=x for all POD in one example, or x can be 0 in another example. Alternatively, x can be 128 where the max number of SIB1-NB transmissions that can be carried on the non-anchor carrier would be 8 in this example. This can be used when SIB1-NB is sent on both anchor and non-anchor carrier, where the first half of repetitions are sent on anchor carrier, while the remaining half of repetitions are sent on non-anchor carrier, or vice versa. In one example whether the first or second half of repetitions are sent on anchor carrier while others are sent on non-anchor carrier can depend on cell ID, e.g. x=O for PCID mod 2=0 and x=128 for PCID mod 2=1 or vice versa. The values of $R_{NB-SIB1}$ supported on non-anchor can be a subset of {4, 8, 16}, e.g. only 4 or 8, or only 8, or only 16. The value of x can depend on whether SIB1-NB is configured to be sent only on anchor carrier or on both anchor and non-anchor carrier.

| $R_{NB-SIB1}$ | PCID | Starting radio frame number for NB-SIB1 repetitions |
|---|---|---|
| 4 | PCID mod 4 = 0 | SFN mod 256 = 0 + x |
|   | PCID mod 4 = 1 | SFN mod 256 = 16 + x |
|   | PCID mod 4 = 2 | SFN mod 256 = 32 + x |
|   | PCID mod 4 = 3 | SFN mod 256 = 48 + x |
| 8 | PCID mod 2 = 0 | SFN mod 256 = 0 + x |
|   | PCID mod 2 = 1 | SFN mod 256 = 16 + x |
| 16 | PCID mod 2 = 0 | SFN mod 256 = 0 + x |
|   | PCID mod 2 = 1 | SFN mod 256 = 1 + x |

In some embodiments, the offset between the anchor carrier and the non-anchor carrier carrying the SIB1-NB can be predefined, and thus there may not necessarily be a need for explicit indication of the non-anchor carrier for SIB1-NB transmission. In one example, the offset can be determined from a predefined mapping based on PCID, e.g. PCID mod K, where K is the number of carriers configured in the NB-IoT cell or a predefined integer. Alternatively, N predefined offsets can be possible, and ceil(log 2(N)) spared bits in MIB-NB can be used to indicate one from the N potential non-anchor carriers to carry SIB1-NB, e.g. N=2 or N=4. As another example, N can be 1 or 3, where the extra status can be used to indicate that the SIB1-NB is sent on the anchor carrier only.

In some embodiments, SIB1-NB can be sent on both anchor and non-anchor carriers. In some embodiments, the following examples can be considered. Whether SIB1-NB transmission is sent on both anchor and non-anchor, or either anchor or non-anchor carrier is implicitly indicated. For example, when the SIB1-NB repetition number is set to 16, the SIB1-NB is transmitted on both anchor and non-anchor carrier if non-anchor carrier is configured: otherwise, the SIB1-NB is always sent on the anchor carrier. In this example, N−1 non-anchor carrier and no configuration of non-anchor carrier for SIB1-NB can be indicated in MIB-NB via ceil(log 2(N)) bits, e.g. N=2 or 4 using 1 or 2 reserved bits in MIB-NB respectively.

In some embodiments, whether SIB1-NB transmission is sent on both anchor and non-anchor, or either anchor or non-anchor carrier is explicitly indicated. The ceil(log 2(N+M−1)) reserved bits in MIB-NB can be used to indicate the following status: "SIB1-NB is sent only on anchor carrier", "SIB1-NB is sent only on non anchor carrier x" where there can be N predefined x values, and "SIB NB is sent both on the anchor carrier and on non-anchor carrier x" where there can be M predefined x values. For example, {N, M} can be {2, 1}, {1, 2}, {3, 4}, {4, 3}, and/or other.

In some embodiments, if SIB1-NB is sent on both anchor and non-anchor carrier, there may not necessarily be no additional bits to indicate the SIB1-NB scheduling information. For example, the SIB1-NB repetitions indicated by MIB-NB can be Y, then Y/2 repetitions will be sent on anchor and non-anchor carriers respectively. Alternatively, the number of repetitions for SIB1-NB indicated by MIB-NB is Y, and Y repetitions are sent on anchor and non-anchor carriers, respectively.

In some embodiments, the NPSS, NSSS, MIB-NB and SIB1-NB can be transmitted on the same carrier as in Rel-13 NB-IoT, or alternatively transmitted on different carriers. For the embodiments where the NPSS, NSSS, MIB-NB and SIB1-NB are transmitted on the same carrier, the anchor carrier definition can follow Rel-13 NB-IoT, i.e. the carrier carrying these signals/channels is defined as the anchor carrier. For the embodiments where the NPSS, NSSS, MIB-NB and SIB1-NB are transmitted on different two earners, the following anchor carrier definition can be considered. In a non limiting example, the carrier with NPSS transmission is defined as the only anchor carrier. The other carrier with NSSS/MIB-NB/SIB1-NB is defined as non-anchor carrier. In another non-limiting example, the carrier in which the UE 102 receives higher layer parameter "operationModeInfo" is defined as the only anchor carrier. The other carrier with NPSS/NSSS/SIB1-NB is defined as non-anchor carrier. In another non limiting example, the two carriers with NPSS/NSSS/MIB-NB/SIB1-NB are defined as the anchor carriers.

In some embodiments, the RRM measurement is defined for anchor carrier only. Alternatively, the RRM measurement can be defined for carriers with transmission of at least one signal/channel from {NPSS, NSSS, MIB-NB, SIB1-NB}, or at least two signals/channels from {NPSS, NSSS, MIB-NB, SIB1-NB}, e.g. only the carrier with NPBCM transmission, or the carrier with both NPSS and NPBCH transmissions, or the carrier with NSSS and NPBCM transmissions, or NSSS and SIB1-NB transmissions, or both carriers with NPSS/NSSS/NPBCH/SIB1-NB transmissions, depending how these signals/channels are transmitted on different carriers.

In some embodiments, for cases in which the NPSS, NSSS, MIB-NB and SIB1-NB are transmitted on different two carriers, in one embodiment, the UE 102 may assume that NRS presents on the same subframes on the two carriers with NPSS/NSSS/MIB-NB/SIB1-NB transmissions.

In some embodiments, for cases in which the NPSS, NSSS, MIB-NB and SIB1-KB are transmitted on different two carriers, the EPRF ratios of NRS on the two carriers with NPSS/NSSS/MIB-NB/SIB1-NB transmissions can be indicated by higher layer signaling. In addition, the EPRE ratio between NRS and NSSS on the two carriers with NPSS/NSSS/MIB-NB/SIB1-NB transmissions can be indicated by higher layer signaling. As another example, the UE 102 may assume the power for NRS transmission on the two carriers are the same, and/or the power for NSSS transmission on the two carriers are the same.

In some embodiments in which NPSS, NSSS, MIB-NB and/or SIB1-NB can be transmitted on different carriers, the UE 102 may only receive or transmit on one NB IoT carrier at each instance. It can receive different transmissions from different carriers at different time instances, by retuning to different NB-IoT carriers. One or more of the following embodiments can be used for determination of NPDCCH search space, and where NPDSCH is transmitted, when there are multiple NB-IoT carriers used for NPSS/NSSS/MIB-NB/SIB1-NB transmission. In some embodiments, in RRC_IDLE mode, the UE 102 may camp on the NB IoT carrier on which the UE 102 receives NPSS. Alternatively, the UE 102 may camp on the NB-IoT carrier on which the UE 102 receives NSSS, NPBCH or SIB1-NB.

In some embodiments, the UE 102 may chose the carrier as the paging PRB based on UE ID, with similar method as defined in Rel-14 non-anchor PRB enhancement. The paging message on NPDSCH is scheduled by NPDCCH on the same PRB.

In some embodiments, for NPDCCH ordered NPRACH, the DCI indicates which carrier to be used for random access procedure. In some embodiments, the NPDCCH UE-specific search space is indicated by dedicated RRC signaling. Before such configuration, the UE 102 may assume all transmissions occur on the NB-IoT carrier where it received NPSS, or the NB-IoT carrier where it received NSSS, or the NB-IoT carrier where it received NPBCH, or the NB-IoT carrier where it received SIB1-NB. After receiving message 4, if the UE 102 cannot be RRC reconfigured, the UE 102 may use a previous configured dedicated RRC configuration.

In some embodiments, the NPRACH resources, including which NB-IoT carrier to be used, are indicated by higher layer signaling, e.g. in SIB2-NB. The following NPDCCH and NPDSCH monitoring during the random access procedure can be at the same NB-IoT carrier as where NPRACH is sent, or be configured by higher layer signaling as well. In some embodiments, the NPDSCH/NPUSCH can be sent on the same carrier where NPDCCH scheduling the NPDSCH/NPUSCH is sent. Alternatively, the DCI can indicate the NB-IoT carrier for NPDSCH/NPUSCH.

In some embodiments, synchronization signals and system information may be used for TDD feNB-IoT. In some embodiments, the NPSS and NSSS can be transmitted on the same NB-IoT carrier. In some embodiments, the NPSS and NSSS can be transmitted on different NB-IoT carriers. In some embodiments, the NPSS may be transmitted on the NB-IoT carrier satisfying the raster constraint. In some embodiments, the NPSS and SIB1-NB or MIB-NB can be transmitted on different NB-IoT carriers. In some embodiments, SIB1-NB and MIB-NB can be transmitted on different NB-IoT carriers. In some embodiments, the offset from the NB IoT carrier with NSSS/SIB1-NB/MIB-NB transmission is predefined. In some embodiments, SIB1-NB and NSSS can be transmitted on the same subframe in alternate radio frame. In some embodiments, the NB-IoT carrier with SIB-NB other than SIB1-NB can be the same NB-IoT carrier as where NSSS is sent, or be indicated by SIB1-NB. In some embodiments, scheduling information in SIB1-NB for other SIB-NB, or in MIB-NB for SIB1-NB can be reinterpreted. In some embodiments, multiple anchor carriers can be defined. In some embodiments, the NPDCCH search space and where NPDCCH is scheduled can be configured by higher layer signaling, or be the same as the NB-IoT carrier with NPSS, NSSS, MIB-NB or SIB1-NB transmission for certain cases (e.g. for idle mode, or transmission before RRC configuration), or be based on UE-ID. In some embodiments, NPSS, NSSS and/or MIB-NB can be transmitted in subframe 0, 5 and/or 9, wherein the transmission of NPSS/NSSS/MIB-NB/SIB1-NB on subframe 9 would puncture the MBSFN transmission on the NB-IoT carrier(s) if subframe 9 is configured for MBSFN for in-band mode. In some embodiments, the SIB1-NB can be sent on both anchor and non-anchor carrier. In some embodiments, the SIB1-NB scheduling info on non-anchor carrier can be indicated the same as on anchor carrier, or the same as in FDD NB-IoT systems expect the potential change of subframe to send SIB1-NB.

In Example 1, an apparatus of a User Equipment (UE) may comprise memory. The apparatus may further comprise processing circuitry. The processing circuitry may be configured to decode, from a generation Node-B (gNB), a narrowband physical downlink control channel (NPDCCH) that indicates a number of narrowband internet-of-things (NB-IoT) downlink subframes for a downlink scheduling delay of a narrowband physical downlink shared channel (NPDSCH) in one or more radio frames configured for time division duplexing (TDD) operation. Subframes of the one or more radio frames may include uplink subframes, NB-IoT downlink subframes for downlink NB-IoT transmissions, and downlink subframes for other downlink transmissions. The processing circuitry may be further configured to determine the downlink scheduling delay based on a count of NB-IoT downlink subframes elapsed since an end of the NPDCCH. The downlink scheduling delay may be determined based on an earliest subframe for which a count of NB-IoT downlink subframes is equal to the number of NB-IoT downlink subframes indicated in the NPDCCH. The memory may be configured to store at least a portion of the NPDCCH.

In Example 2, the subject matter of Example 1, wherein the NPDCCH may further indicate a number of repetitions of the NPDSCH. The processing circuitry may be further configured to decode multiple repetitions of the NPDSCH. A first chronological repetition of the NPDSCH may be received from the gNB in accordance with the downlink scheduling delay.

In Example 3, the subject matter of one or any combination of Examples 1-2, wherein the processing circuitry may be further configured to decode, from the gNB, a system information block type-1 narrowband (SIB1-NB) that includes a plurality of configuration bits. At least some values indicated by the configuration bits may indicate different candidate subframe configurations for TDD operation for the radio frames.

In Example 4, the subject matter of one or any combination of Examples 1-3, wherein the processing circuitry may be further configured to determine, based on an indicator included in a system information block type-1 narrowband (SIB1-NB) received from the gNB, a subframe configuration for the radio frames. The radio frames may include ten subframes indexed in a range of zero to nine. In each radio frame, the subframe indexed by five may include a narrowband primary synchronization signal (NPSS). In alternating radio frames, the subframe indexed by zero may include a narrowband synchronization signal (NSSS).

In Example 5, the subject matter of one or any combination of Examples 1-4, wherein the subframe configuration may be one of a plurality of candidate subframe configurations. For each of the candidate subframe configurations, at least the subframes indexed by zero, five, and nine may be allocated as downlink subframes.

In Example 6, the subject matter of one or any combination of Examples 1-5, wherein the UE may be arranged to operate in accordance with a further enhanced narrowband internet of things (feNB-IoT) protocol.

In Example 7, the subject matter of one or any combination of Examples 1-6, wherein the apparatus may further include a transceiver to receive the NPDCCH. The processing circuitry may include a baseband processor to decode the NPDCCH.

In Example 8, a computer-readable storage medium may store instructions for execution by one or more processors to perform operations for communication by a generation Node-B (gNB). The operations may configure the one or more processors to encode, for transmission, a narrowband physical downlink control channel (NPDCCH) that schedules transmission of a narrowband physical downlink shared channel (NPDSCH) in one or more radio frames configured for time-division duplexing (TDD) operation. The radio frames may include ten subframes indexed in a range of zero to nine. The radio frames may be indexed by system frame numbers (SFNs). The operations may further configure the one or more processors to encode, for transmission in tire radio frames in the subframe indexed by five, a narrowband primary synchronization signal (NPSS). The operations may configure the one or more processors to encode, for transmission in the radio frames of even SFNs and in the subframe indexed by zero, a narrowband primary synchronization signal (NSSS). The operations may configure the one or more processors to encode, for transmission in the radio frames of odd SFNs and in the subframe indexed by zero, a system information block type-1 narrowband (SIB1-NB).

In Example 9, the subject matter of Example 8, wherein the operations may further configure the one or more processors to determine a number of repetitions of the NPDSCH based at least partly on a target decoding performance level at a User Equipment (UE). The operations may configure the one or more processors to encode the NPDCCH to indicate the number of repetitions of the NPDSCH.

In Example 10, an apparatus of a generation Node-B (gNB) may comprise memory. The apparatus may further comprise processing circuitry. The processing circuitry may be configured to encode, for transmission, a narrowband physical downlink control channel (NPDCCH) that indicates a number of downlink subframes for a downlink scheduling delay of a narrowband physical downlink shared channel (NPDSCH) in a radio frame configured for time-division duplexing (TDD) operation. Subframes of the radio frames may include uplink subframes, narrowband internet-of-things (NR-IoT) downlink subframes, and downlink subframes. The processing circuitry may be further configured to encode the NPDSCH for transmission in accordance with the downlink scheduling delay. The downlink scheduling delay may be based on an earliest subframe for which a number of NB-IoT downlink subframes that has elapsed since the end of the NPDCCH is equal to the number of downlink subframes indicated in the NPDCCH. The memory may be configured to store at least a portion of the NPDCCH.

In Example 11, the subject matter of Example 10, wherein the radio frames may include ten subframes indexed in a range of zero to nine. The processing circuitry may be configured to encode, for transmission in each radio frame and in the subframe indexed by five, a narrowband primary synchronization signal (NPSS). The processing circuitry may be further configured to encode, for transmission in a first radio frame of a pair of consecutive radio frames and in the subframe indexed by zero, a downlink signal that includes a narrowband primary synchronization signal (NSSS) and excludes a system information block type-1 narrowband (SIB1-NB). The processing circuitry may be further configured to encode, for transmission in a first radio frame of a pair of consecutive radio frames and in the subframe indexed by zero, a downlink signal that includes the SIB1-NB and excludes the NSSS.

In Example 12, the subject matter of one or any combination of Examples 10-11, wherein the radio frames may be indexed by system frame numbers (SFNs). The subframes indexed by zero in the radio frames of even RFNs may include the NSSS. The subframes indexed by zero in the radio frames of odd RFNs may include the SIB1-NB.

In Example 13, the subject matter of one or any combination of Examples 10-12, wherein in each radio frame, the subframe indexed by nine may include a narrowband physical broadcast channel (NPBCH).

In Example 14, the subject matter of one or any combination of Examples 10-13, wherein the processing circuitry may be further configured to encode, for transmission on a first carrier, a system information block type-1 narrowband (SIB1-NB) that includes system information. The SIB1-NB may further indicate transmission, by the gNB, of system information block type-2 narrowband (SIB2-NB) on a second carrier. The processing circuitry may be further configured to encode the SIB2-NB to indicate frequency resources allocated for narrowband physical random access channel (NPRACH) transmissions.

In Example 15, the subject matter of one or any combination of Examples 10-14, wherein the processing circuitry may be further configured to encode, for transmission on sin anchor carrier: a narrowband primary synchronization signal (NPSS), and a master information block (MIB) that includes one or more hits to indicate a non-anchor earner on which a system information block type-1 narrowband (SIB1-NB) is transmitted by the gNB. The processing circuitry may be further configured to encode, for transmission on the non-anchor carrier, the SIB1-NB.

In Example 16, the subject matter of one or any combination of Examples 10-15, wherein the processing circuitry may be further configured to encode the NPDCCH for transmission in accordance with a number of repetitions included in: 1, 2, 4, 8, 16, 32, 64, 128, 256, 512, 1024, and 2048. The processing circuitry may be further configured to encode the NPDSCH for transmission in accordance with a number of repetitions included in: 1, 2, 4, 8, 16, 32, 64, 128, 192, 256, 384, 512, 768, 1024, 1536, and 2048.

In Example 17, the subject matter of one or any combination of Examples 10-16, wherein the processing circuitry may be further configured to encode the NPDSCH in accordance with a maximum transport block size (TBS) of 1000 bits or 2536 bits.

In Example 18, the subject matter of one or any combination of Examples 10-17, wherein the radio frame may include ten subframes indexed in a range of zero through nine. The processing circuitry may be further configured to encode a narrowband reference signal (NRS) for transmission in a subframe that: is indexed by 0, 6, 7, 8 or 9; and does not include a narrowband secondary synchronization signal (NSSS).

In Example 19, the subject matter of one or any combination of Examples 10-18, wherein the processing circuitry may be further configured to encode, for transmission, a narrowband primary synchronization signal (NPSS) and a narrowband secondary synchronization signal (NSSS). Subframe locations of the NPSS and the NSSS may be used to indicate TDD operation or frequency division duplexing (FDD) operation.

In Example 20, the subject matter of one or any combination of Examples 10-19, wherein the gNB may be configurable for operation in accordance with one or more operation modes that include an in-band operation mode, a guard-hand operation mode, and a stand-alone operation mode. The processing circuitry may be further configured to encode, in accordance with transmission locations that are common for the operation modes, a master information block (MIB), a narrowband primary synchronization signal (NPSS) and a narrowband secondary synchronization signal (NSSS).

In Example 21, the subject matter of one or any combination of Examples 10-20, wherein the processing circuitry may be further configured to encode a system information block type-1 narrowband (SIB1-NB), for transmission, wherein if a number of repetitions of the SIB1-NB is 4, a stalling radio frame of the SIB1-NB is 1, if a physical cell identifier (PCID) modulo-4 is equal to 0; 17, if the PCID modulo-4 is equal to 1; 33, if the PCID modulo-4 is equal to 2; and 49, if the PCID modulo-4 is equal to 3. If the number of repetitions of the SIB1-NB is 8, the starting radio frame of the SIB1-NB is: 1, if the PCID modulo-2 is equal to 0; and 17, if the PCID modulo-2 is equal to 1. If the number of repetitions of the SIB1-NB is 16, the starting radio frame of the SIB1-NB is 1.

In Example 22, the subject matter of one or any combination of Examples 10-21, wherein the processing circuitry may be further configured to encode a system information block type-1 narrowband (SIB1-NB), for transmission on a non-anchor carrier. A number of repetitions of the SIB1-NB may be included in a subset of a set that includes 4, 8, and 16.

In Example 23, the subject matter of one or any combination of Examples 10-22, wherein the processing circuitry may be further configured to encode the NPDCCH in accordance with a starting subframe parameter that defines a starting subframe of an NPDCCH search space. The starting subframe parameter may be one of: 2, 4, 8, 16, 32, 48, 64, and 128.

In Example 24, an apparatus of a generation Node-B (gNB) may comprise means for encoding, for transmission, a narrowband physical downlink control channel (NPDCCH) that schedules transmission of a narrowband physical downlink shared channel (NPDSCH) in one or more radio frames configured for time-division duplexing (TDD) operation. The radio frames may include ten subframes indexed in a range of zero to nine. The radio frames may be indexed by system frame numbers (SFNs). The apparatus may further comprise means for encoding, for transmission in the radio frames in the subframe indexed by five, a narrowband primary synchronization signal (NPSS). The apparatus may further comprise means for encoding, for transmission in the radio frames of even SFNs and in the subframe indexed by zero, a narrowband primary synchronization signal (NSSS). The apparatus may further comprise means for encoding, for transmission in the radio frames of odd SFNs and in the subframe indexed by zero, a system information block type-1 narrowband (SIB1-NB).

In Example 25, the subject matter of Example 24, wherein the apparatus may further comprise means for determining a number of repetitions of the NPDSCH based at least partly on a target decoding performance level at a User Equipment (UE). The apparatus may further comprise means for encoding the NPDCCH to indicate the number of repetitions of the NPDSCH.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. An apparatus, comprising:
  memory; and
  processing circuitry in communication with the memory and configured to:
    decode, from a base station, a narrowband physical downlink control channel (NPDCCH) that indicates a number of narrowband internet-of-things (NB-IoT) downlink subframes for a downlink scheduling delay of a narrowband physical downlink shared channel (NPDSCH) in one or more radio frames configured for time-division duplexing (TDD) operation, and wherein subframes of the one or more radio frames include uplink subframes, NB-IoT downlink subframes for downlink NB-IoT transmissions, and downlink subframes for other downlink transmissions;

determine the downlink scheduling delay based on a count of valid NB-IoT downlink subframes elapsed since an end of the NPDCCH, wherein the count excludes uplink subframes and downlink subframes for other downlink transmissions; and decode, from the base station, a system information block type-1 narrowband (SIB1-NB), wherein the SIB1-NB is transmitted on every other radio frame, and wherein the starting radio frame number for SIB1-NB repetitions is based on a physical cell ID (PCID), a system frame number (SFN) and a number of repetitions, R.

2. The apparatus according to claim 1, wherein the NPDCCH further indicates a number of repetitions of the NPDSCH, and wherein the processing circuitry is further configured to decode multiple repetitions of the NPDSCH, wherein a first chronological repetition of the NPDSCH is received from the base station in accordance with the downlink scheduling delay.

3. The apparatus according to claim 1, the processing circuitry further configured to:
determine, based on an indicator included in the SIB1-NB received from the base station, a subframe configuration for the one or more radio frames, wherein the one or more radio frames include ten subframes indexed in a range of zero to nine, wherein, in each radio frame, the subframe indexed by five includes a narrowband primary synchronization signal (NPSS), wherein, in alternating radio frames, the subframe indexed by zero includes a narrowband secondary synchronization signal (NSSS).

4. The apparatus according to claim 1, wherein the subframe configuration is one of a plurality of candidate subframe configurations, and wherein for each of the candidate subframe configurations, at least the subframes indexed by zero, five, and nine are allocated as downlink subframes.

5. The apparatus according to claim 1, wherein the processing circuitry is further configured to operate in accordance with a further enhanced narrowband internet-of-things (feNB-IoT) protocol.

6. The apparatus according to claim 1, wherein:
the apparatus further includes a transceiver to receive the NPDCCH, and the processing circuitry includes a baseband processor to decode the NPDCCH.

7. The apparatus according to claim 1, wherein the PCID, the SFN, and the number of repetitions, R, are according to the table below

| R | PCID | Staring radio frame number for SIB1-NB repetitions |
|---|---|---|
| 4 | PCID mod 4 = 0 | SFN mod 256 = 1 |
|   | PCID mod 4 = 1 | SFN mod 256 = 17 |
|   | PCID mod 4 = 2 | SFN mod 256 = 33 |
|   | PCID mod 4 = 3 | SFN mod 256 = 49 |
| 8 | PCID mod 4 = 0 | SFN mod 256 = 1 |
|   | PCID mod 4 = 1 | SFN mod 256 = 17 |
| 16 | All PCIDs | SFN mod 256 = 1. |

8. A base station, comprising:
memory; and
a processor in communication with the memory and configured to cause the base station to:
encode, for transmission, a narrowband physical downlink control channel (NPDCCH) that schedules transmission of a narrowband physical downlink shared channel (NPDSCH) in one or more radio frames configured for time-division duplexing (TDD) operation, wherein the NPDCCH indicates a number of narrowband internet-of-things (NB-IoT) downlink subframes for a downlink scheduling delay of the NPDSCH, and wherein subframes of the one or more radio frames include uplink subframes, NB-IoT downlink subframes for downlink NB-IoT transmissions, and downlink subframes for other downlink transmissions; and encode, for transmission, a system information block type-1 narrowband (SIB1-NB), wherein the SIB1-NB is transmitted on every other radio frame, and wherein the starting radio frame number for SIB1-NB repetitions is based on a physical cell ID (PCID), a system frame number (SFN) and a number of repetitions, R.

9. The base station of claim 8, wherein the processor is further configured to cause the base station to:
determine the number of repetitions of the NPDSCH based at least partly on a target decoding performance level at a User Equipment (UE); and
encode the NPDCCH to indicate the number of repetitions of the NPDSCH.

10. An apparatus, comprising:
a memory; and
processing circuitry in communication with the memory, wherein the processing circuitry is configured to:
encode, for transmission, a narrowband physical downlink control channel (NPDCCH) that indicates a number of downlink subframes for a downlink scheduling delay of a narrowband physical downlink shared channel (NPDSCH) in one or more radio frames configured for time-division duplexing (TDD) operation, wherein subframes of the one or more radio frames include uplink subframes, narrowband internet-of-things (NB-IoT) downlink subframes, and downlink subframes;

encode the NPDSCH for transmission in accordance with the downlink scheduling delay, wherein the downlink scheduling delay is based on an earliest subframe for which a number of NB-IoT downlink subframes that has elapsed since an end of the NPDCCH is equal to the number of downlink subframes indicated in the NPDCCH, wherein the memory is configured to store at least a portion of the NPDCCH; and encode, for transmission, a system information block type-1 narrowband (SIB1-NB), wherein the SIB1-NB is transmitted on every other radio frame, and wherein the starting radio frame number for SIB1-NB repetitions is based on a physical cell ID (PCID), a system frame number (SFN) and a number of repetitions, R.

11. The apparatus according to claim 10,
wherein, when the one or more radio frames include ten subframes indexed in a range of zero to nine, the processing circuitry is further configured to:
encode, for transmission in each radio frame, in the subframe indexed by five, a narrowband primary synchronization signal (NPSS);

encode, for transmission in a first radio frame of a pair of consecutive radio frames and in a subframe indexed by zero, a downlink signal that includes a narrowband secondary synchronization signal (NSSS) and excludes a system information block type-1 narrowband (SIB1-NB); and encode, for transmission in a second radio frame of the pair of consecutive radio frames and in a subframe indexed by zero, a downlink signal that includes the SIB1-NB and excludes the NSSS.

12. The apparatus according to claim 11, wherein, when the one or more radio frames are indexed by system frame numbers (SFNs), subframes indexed by zero in the one or more radio frames of even SFNs include the NSSS and the subframes indexed by zero in the one or more radio frames of odd SFNs include the SIB1-NB.

13. The apparatus according to claim 11, wherein in each radio frame, the subframe indexed by nine includes a narrowband physical broadcast channel (NPBCH).

14. The apparatus according to claim 10, wherein the SIB1-NB further indicates transmission of system information block type-2 narrowband (SIB2-NB) on a second carrier; and wherein the processing circuitry is further configured to encode, for transmission, the SIB2-NB to indicate frequency resources allocated for narrowband physical random access channel (NPRACH) transmissions.

15. The apparatus according to claim 10, the processing circuitry further configured to:

encode, for transmission on an anchor carrier a narrowband primary synchronization signal (NPSS) and a master information block (MIB) that includes one or more bits to indicate a non-anchor carrier on which the SIB1-NB is transmitted.

16. The apparatus according to claim 10, the processing circuitry further configured to:

encode the NPDCCH for transmission in accordance with a number of repetitions included in 1, 2, 4, 8, 16, 32, 64, 128, 256, 512, 1024, and 2048; and encode the NPDSCH for transmission in accordance with a number of repetitions included in 1, 2, 4, 8, 16, 32, 64, 128, 192, 256, 384, 512, 768, 1024, 1536, and 2048.

17. The apparatus according to claim 10, the processing circuitry further configured to:

encode the NPDSCH in accordance with a maximum transport block size (TBS) of 1000 bits or 2536 bits.

18. The apparatus according to claim 10, wherein the radio frame includes ten subframes indexed in a range of zero through nine, and wherein the processing circuitry is further configured to encode a narrowband reference signal (NRS) for transmission in a subframe that:

is indexed by 0, 6, 7, 8 or 9; and does not include a narrowband secondary synchronization signal (NSSS).

19. The apparatus according to claim 10, the processing circuitry further configured to:

encode, for transmission, a narrowband primary synchronization signal (NPSS) and a narrowband secondary synchronization signal (NSSS), wherein subframe locations of the NPSS and the NSSS are used to indicate TDD operation or frequency division duplexing (FDD) operation.

20. The apparatus according to claim 10, wherein the processing circuitry is further configured to encode, in accordance with transmission locations that are common for a plurality of operation modes, a master information block (MIB), a narrowband primary synchronization signal (NPSS), and a narrowband secondary synchronization signal (NSSS).

* * * * *